US010710736B2

(12) United States Patent
Fleming et al.

(10) Patent No.: US 10,710,736 B2
(45) Date of Patent: Jul. 14, 2020

(54) LATCH INDICATION SYSTEM AND METHOD FOR A FAN COWL OF AN AIR VEHICLE

(71) Applicant: The Boeing Company, Chicago, IL (US)

(72) Inventors: Michael A. Fleming, Bellevue, WA (US); James E. Cusworth, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 380 days.

(21) Appl. No.: 15/798,332

(22) Filed: Oct. 30, 2017

(65) Prior Publication Data

US 2019/0127075 A1   May 2, 2019

(51) Int. Cl.
| | |
|---|---|
| *B64D 29/06* | (2006.01) |
| *B64D 45/00* | (2006.01) |
| *B64D 29/08* | (2006.01) |
| *F01D 25/26* | (2006.01) |
| *E05B 41/00* | (2006.01) |
| *E05C 19/14* | (2006.01) |
| *E05B 17/00* | (2006.01) |

(52) U.S. Cl.
CPC ............. *B64D 29/06* (2013.01); *B64D 29/08* (2013.01); *B64D 45/0005* (2013.01); *E05B 41/00* (2013.01); *E05C 19/145* (2013.01); *F01D 25/265* (2013.01); *E05B 17/0025* (2013.01); *F05B 2240/14* (2013.01); *F05D 2240/14* (2013.01)

(58) Field of Classification Search
CPC .......... B64D 29/06; B64D 29/08; B64C 1/14; B64C 1/1407; B64C 1/1415; B64C 1/1423; B64C 1/143; B64C 1/1438; B64C 1/1446
See application file for complete search history.

(56) References Cited

U.S. PATENT DOCUMENTS

| | | | |
|---|---|---|---|
| 2015/0021928 A1* | 1/2015 | Garc A De La Torre et al. .......... | |
| | | | E05B 81/72 |
| | | | 292/137 |
| 2015/0191257 A1 | 7/2015 | Marche | |
| 2016/0280383 A1* | 9/2016 | Lee ......................... | B64D 29/08 |
| 2016/0340024 A1* | 11/2016 | Pautis .................... | B64D 29/08 |

FOREIGN PATENT DOCUMENTS

EP    1314839 A1    5/2003

* cited by examiner

*Primary Examiner* — Nicholas McFall

(57) ABSTRACT

There is provided a latch indication system for a fan cowl of an air vehicle. The system has a door movable between a closed position and an open position, and has a handle movable between a handle stowed position and a handle deployed position. The system has a linkage assembly mechanically connecting the handle to a cover assembly. The cover assembly has a movable member movable between a movable member stowed position and a movable member deployed position, such that when the door is in the closed position and the handle is in the handle stowed position, the system indicates that one or more latch assemblies of the fan cowl are in a latched condition, and when the door is in the open position and the handle is in the handle deployed position, the system indicates that one or more of the latch assemblies are in an unlatched condition.

20 Claims, 14 Drawing Sheets

LATCH INDICATION SYSTEM AND METHOD FOR A FAN COWL OF AN AIR VEHICLE

FIELD

The disclosure relates generally to systems and methods for engine fan cowls of air vehicles, and more particularly, to systems and methods for indicating a latched condition or an unlatched condition of latch assemblies on engine fan cowls of air vehicles, such as aircraft.

BACKGROUND

Air vehicles, such as commercial and military jet aircraft, typically use one or more propulsion systems each powered by an engine, such as a gas turbine engine. The propulsion system may include a nacelle that houses the engine, and the nacelle may include a fan cowl that forms an outer portion of the nacelle and that surrounds an engine fan. The fan cowl typically includes two portions or halves that may be latched together and unlatched, via one or more latch assemblies located at the bottom or lower portion of the fan cowl. The fan cowl portions or halves may be unlatched to gain access to the fan cowl, for example, to perform maintenance, service, and/or inspection operations of the fan cowl and/or engine, while the air vehicle is grounded.

However, the location of such latch assemblies may make it difficult to notice, upon a quick visual inspection, whether the fan cowl is in a latched condition or in an unlatched condition. If the latch assemblies are not properly latched or secured prior to engine operation and flight, the fan cowl halves may separate and detach from the nacelle during flight.

Known systems and methods exist to indicate a latched condition or an unlatched condition of the latch assemblies on known fan cowls. However, such known systems and methods may suffer from various disadvantages or insufficiencies.

For example, one known indication system and method involves the use of electronic components, such as sensors, installed at or in the fan cowl that are wired to the flight deck to provide an indication or signal in the flight deck equipment regarding a latched condition or an unlatched condition of the latch assemblies. However, such known indication system and method does not provide a real-time indication during maintenance, service, and/or inspection operations, and may require personnel performing such operations to access the flight deck to retrieve the information regarding the indication status. Moreover, such known indication system and method may require electrical power to operate, and thus, the aircraft power must be operational and turned on to find out the information regarding the indication status. However, the aircraft power may not typically be turned on by the pilot until hours after a mechanic or service operator has performed the maintenance, service, and/or inspection operations. In addition, such known indication system and method having sensors and wiring may have reliability issues after being exposed to a high heat and high vibration environment in the fan cowl and engine during flight. Further, such known indication system and method may require additional electronics that may impact multiple computing systems in the aircraft, and may affect flight crew procedures and workload.

Another known indication system and method uses the latch of the latch assembly itself as visual indication by manually attaching a colored flag to the latch of the latch assembly during maintenance, service, and/or inspection operations. However, the size and position of the latches of the latch assemblies, when unlatched, may not be prominent enough to ensure that such colored flag would be noticed during the maintenance, service, and/or inspection operations, for example, a flight crew walk around inspection. Moreover, at least one regulatory agency, for example, the European Aviation Safety Agency (EASA), has deemed such known indication system and method, alone, insufficient for certain aircraft models.

Accordingly, what is needed is a system and method for a latch indication system for an engine fan cowl of an air vehicle that provides enhanced visualization and detection, in real-time, of the latched condition or unlatched condition of one or more latch assemblies on the engine fan cowl, that is easily retrofittable on existing air vehicles, that is simple to use and reliable, and that provides advantages over known systems and methods.

SUMMARY

This need for a system and method for an improved latch indication system for an engine fan cowl of an air vehicle is satisfied. As discussed in the below detailed description, embodiments of the system and method may provide significant advantages over existing systems and methods.

In an embodiment of the disclosure, there is provided a latch indication system for a fan cowl of an air vehicle. The latch indication system comprises a door movable between a closed position and an open position. The latch indication system further comprises a handle coupled to an interior of the fan cowl. The handle is movable between a handle stowed position and a handle deployed position, only when the door is in the open position.

The latch indication system further comprises a linkage assembly mechanically connecting the handle to a cover assembly. The cover assembly has a movable member movable between a movable member stowed position and a movable member deployed position, such that when the door is in the closed position and the handle is in the handle stowed position, the latch indication system indicates that one or more latch assemblies of the fan cowl are in a latched condition, and when the door is in the open position and the handle is in the handle deployed position, the latch indication system indicates that one or more of the latch assemblies of the fan cowl are in an unlatched condition.

In another embodiment of the disclosure, there is provided an air vehicle. The air vehicle comprises a fuselage, at least one wing attached to the fuselage, and one or more engines attached to the at least one wing. Each of the one or more engines has a fan cowl.

The air vehicle further comprises a latch indication system installed in each fan cowl. The latch indication system comprises a door movable between a closed position and an open position. The latch indication system further comprises a handle coupled to an interior of the fan cowl. The handle is movable between a handle stowed position and a handle deployed position, only when the door is in the open position.

The latch indication system further comprises a linkage assembly mechanically connecting the handle to a cover assembly. The cover assembly has a movable member movable between a movable member stowed position and a movable member deployed position, such that when the door is in the closed position and the handle is in the handle stowed position, the latch indication system indicates that one or more latch assemblies of the fan cowl are in a latched condition, and when the door is in the open position and the handle is in the handle deployed position, the latch indication system indicates that one or more of the latch assemblies of the fan cowl are in an unlatched condition.

In another embodiment of the disclosure, there is provided a method for using a latch indication system for a fan cowl of an air vehicle. The method comprises the step of installing the latch indication system in the fan cowl of the air vehicle. The latch indication system comprises a door; a handle coupled to an interior of the fan cowl, and a linkage assembly mechanically connecting the handle to a cover assembly. The cover assembly has a movable member covering at least one latch assembly.

The method further comprises the step of moving the door from a closed position to an open position. The method further comprises the step of moving the handle from a handle stowed position to a handle deployed position, to concurrently move the movable member of the cover assembly from a movable member stowed position to a movable member deployed position.

The method further comprises the step of moving the at least one latch assembly from the latched condition to the unlatched condition. The method further comprises the step of opening the fan cowl to perform one or more maintenance and service operations.

The method further comprises the step of closing the fan cowl, after performing the one or more maintenance and service operations. The method further comprises the step of moving the at least one latch assembly from a unlatched condition to an latched condition.

The method further comprises the step of moving the handle from the handle deployed position to the handle stowed position, to concurrently move the movable member of the cover assembly from the movable member deployed position to the movable member stowed position. The method further comprises the step of moving the door from the open position to the closed position. The door in the open position is a visual indicator that the at least one latch assembly is in the unlatched condition, and wherein the door in the closed position is the visual indicator that the at least one latch assembly is in the latched condition.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
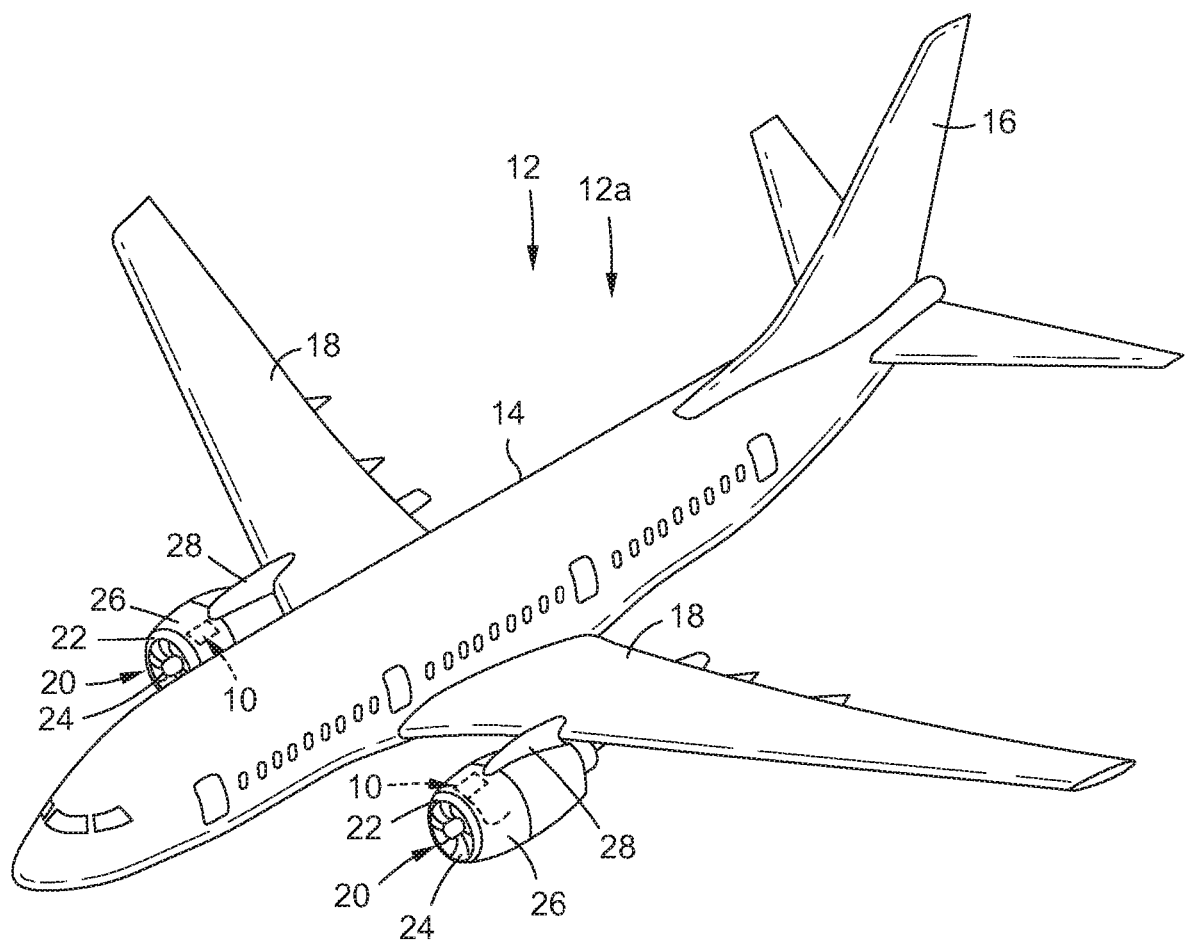
FIG. 1 is an illustration of a perspective view of an air vehicle that incorporates an exemplary embodiment of a latch indication system of the disclosure.

Now referring to the Figures, FIG. 1 is an illustration of a perspective view of an air vehicle 12, such as in the form of an aircraft 12a, that incorporates an exemplary embodiment of a latch indication system 10 of the disclosure in each fan cowl 26. As shown in FIG. 1, the air vehicle 12, such as in the form of aircraft 12a, comprises a fuselage 14, a tail 16, wings 18, and engines 20, such as gas turbine engines. As further shown in FIG. 1, each engine 20 is encased with a nacelle 22, and each engine 20 has a fan 24. As further shown in FIG. 1, each nacelle 22 includes the fan cowl 26.

A mast 28 (see FIG. 1), such as in the form of a pylon, extends along the top of each nacelle 22 (see FIG. 1).

Figure 7A:
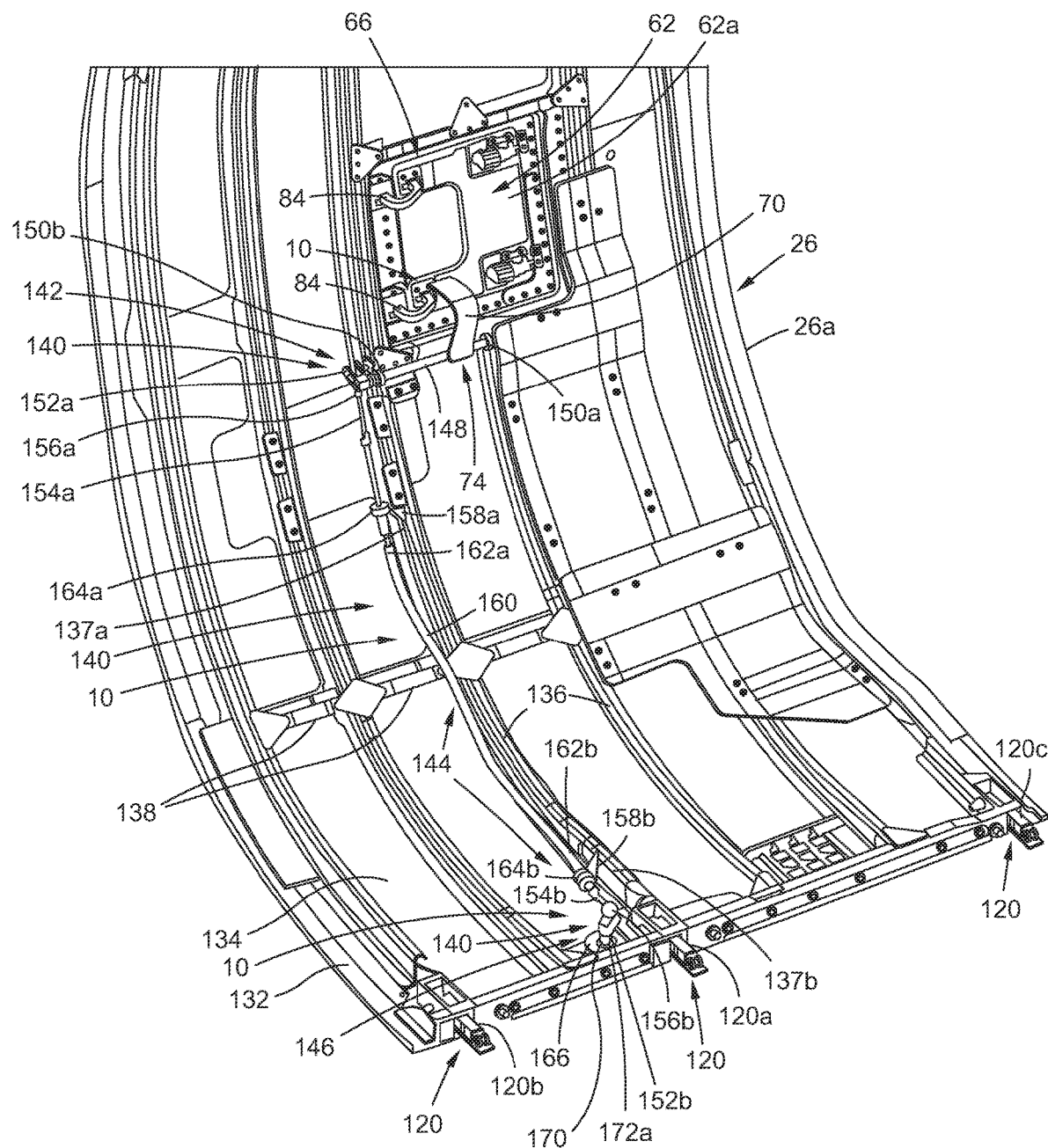
FIG. 7A is an illustration of a perspective view of an interior of a fan cowl first portion showing an embodiment of a latch indication system of the disclosure.

Disclosed herewith is an exemplary embodiment of the latch indication system 10 (see FIG. 7A). The latch indication system 10 (see FIG. 7A) may be used with air vehicles 12 (see FIG. 1), such as aircraft 12a (see FIG. 1), that are new and unused, or the latch indication system 10 (see FIG. 7A) may be used or retrofitted into existing air vehicles or aircraft that have already been in use.

Figure 2:
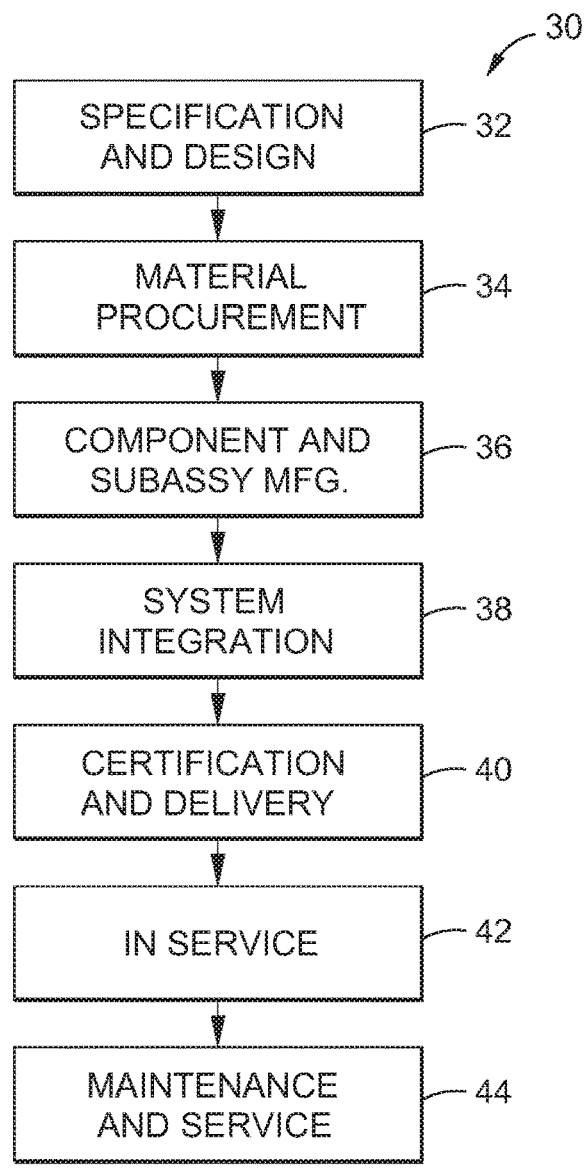
FIG. 2 is an illustration of a flow diagram of an aircraft manufacturing and service method.
Figure 3:
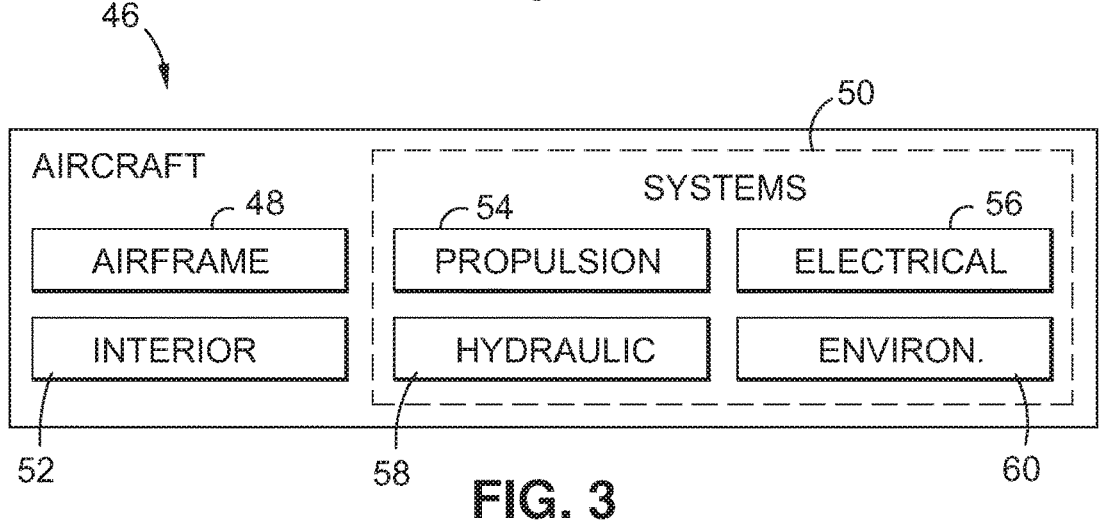
FIG. 3 is an illustration of a functional block diagram of an aircraft.

Now referring to FIGS. 2 and 3, FIG. 2 is an illustration of a flow diagram of an aircraft manufacturing and service method 30, and FIG. 3 is an illustration of a functional block diagram of an aircraft 46. Referring to FIGS. 2-3, embodiments of the disclosure may be described in the context of the aircraft manufacturing and service method 30 as shown in FIG. 2, and the aircraft 46 as shown in FIG. 3.

As shown in FIG. 2, during pre-production, exemplary aircraft manufacturing and service method 30 may include specification and design 32 of the aircraft 46 and material procurement 34. As further shown in FIG. 2, during manufacturing, component and subassembly manufacturing 36 and system integration 38 of the aircraft 46 takes place. Thereafter, the aircraft 46 may go through certification and delivery 40 (see FIG. 2) in order to be placed in service 42 (see FIG. 2). While in service 42 by a customer, the aircraft 46 may be scheduled for one or more maintenance and service operations 44 (see FIG. 2) (which may also include modification, reconfiguration, refurbishment, and other suitable services).

Each of the processes of the aircraft manufacturing and service method 30 (see FIG. 2) may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 3, the aircraft 46 produced by the exemplary aircraft manufacturing and service method 30 may include an airframe 48 with a plurality of systems 50 and an interior 52. Examples of the plurality of systems 50 may include one or more of a propulsion system 54 (see FIG. 3), an electrical system 56 (see FIG. 3), a hydraulic system 58 (see FIG. 3), and an environmental system 60 (see FIG. 3). Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 30 (see FIG. 2). For example, components or subassemblies corresponding to component and subassembly manufacturing 36 (see FIG. 2) may be fabricated or manufactured in a manner similar to components or subassemblies produced while the aircraft 46 (see FIG. 3) is in service 42 (see FIG. 2). Also, one or more apparatus embodiments, method embodiments, or a combination thereof, may be utilized during component and subassembly manufacturing 36 (see FIG. 2) and system integration 38 (see FIG. 2), for example, by substantially expediting assembly of or reducing the cost of the aircraft 46 (see FIG. 3). Similarly, one or more of apparatus embodiments, method embodiments, or a combination thereof, may be utilized while the aircraft 46 (see FIG. 3) is in service 42 (see FIG. 2), for example and without limitation, to one or more maintenance and service operations 44 (see FIG. 2).

Figure 4A:
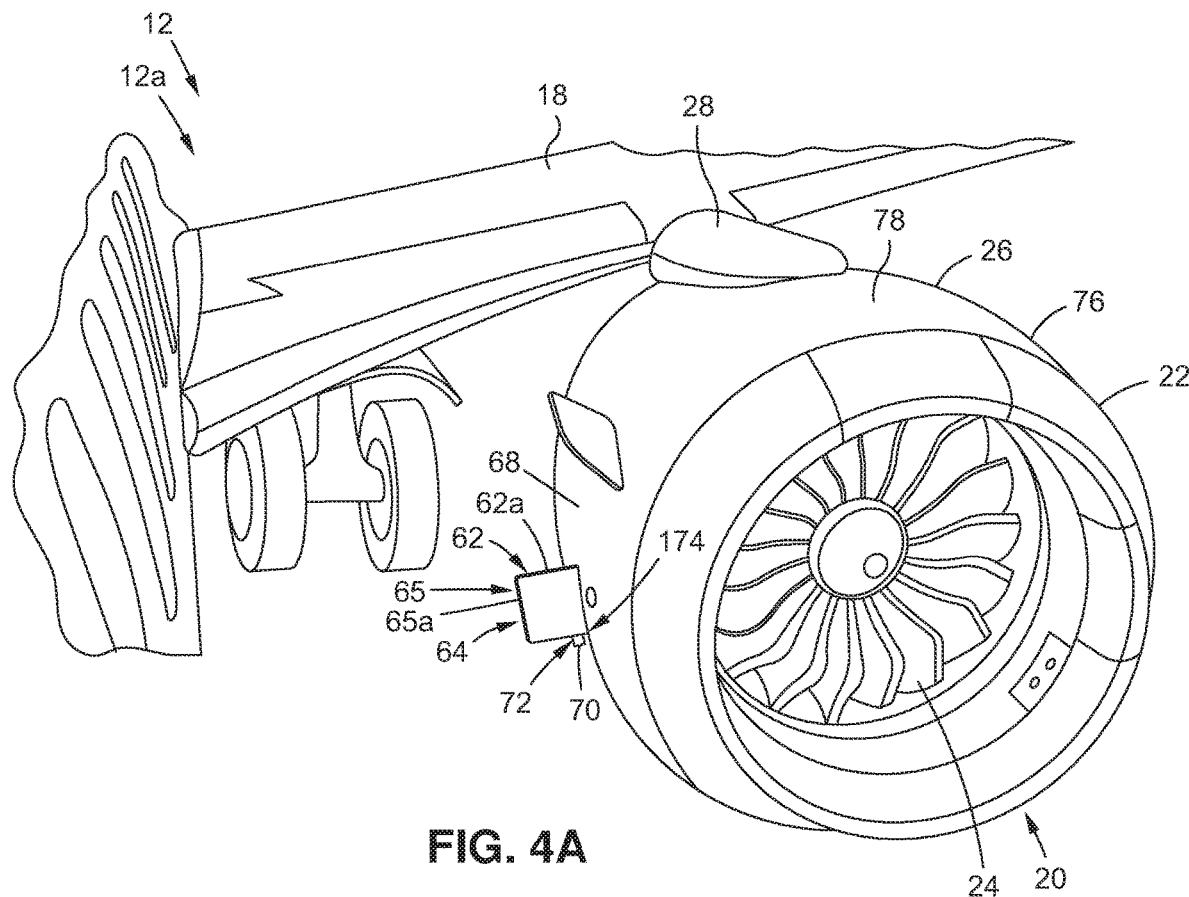
FIG. 4A is an illustration of a front perspective view of an engine of an air vehicle showing a door on a fan cowl in an open position.

Now referring to FIG. 4A, FIG. 4A is an illustration of a front perspective view of an engine 20 of an air vehicle 12, such as an aircraft 12a, showing a door 62, such as an oil tank door 62a, in an open position 64 on a fan cowl 26. The latch indication system 10 (see FIGS. 1, 7A, 8A) is comprised, in part, of existing or known parts or components typically found on fan cowls 26 (see FIGS. 1, 4A) of air vehicles 12 (see FIGS. 1, 4A), such as aircraft 12a (see FIGS. 1, 4A), and a novel combination of additional parts or components, discussed in further detail below, that provide the interlock features required.

The latch indication system 10 (see FIGS. 1, 7A, 8A) comprises the door 62, such as the oil tank door 62a, which is an existing or known part on the fan cowl 26 (see FIGS. 1, 4A). In the disclosed latch indication system 10 (see FIGS. 1, 7A, 8A), the door 62, such as the oil tank door 62a, uniquely serves as, and is, a visual indicator 65 (see FIG. 4A), such as a visual indicator 65a (see FIG. 4A) in the open position 64 (see FIG. 4A), for the latch indication system 10 (see FIGS. 7A, 8B), to indicate that one or more the latch assemblies 120 (see FIG. 8B) are in an unlatched condition 124 (see FIG. 8B). The size and prominence of the door 62 (see FIGS. 4A, 8B) in the open position 64 (see FIGS. 4A, 8B) provide enhanced and improved visualization and detection and substantially ensure that such door 62 (see FIGS. 4A, 8B) in the open position 64 (see FIGS. 4A, 8B) will be noticed by personnel, operators, and flight crew during one or more maintenance and service operations 44 (see FIG. 2) and inspections that may be performed on the air vehicle 12 (see FIG. 1) while the air vehicle 12 is grounded.

FIG. 4A shows the nacelle 22, the fan 24, and the mast 28 of the engine 20, where the engine 20 is coupled to the wing 18 of the air vehicle 12, such as the aircraft 12a. The engine 20 shown in FIG. 4A is a left hand engine. The engine 20 (see FIG. 1) on the wing 18 (see FIG. 1) opposite the left hand engine is a right hand engine. As further shown in FIG. 4A, the fan cowl 26 has a first side 68, a second side 76, a top end 78, and a bottom end 80 (see FIG. 4B), and the fan cowl 26 is a left hand fan cowl. FIG. 4A shows the door 62, such as the oil tank door 62a, in the open position 64, and extending outwardly from the first side 68 of the fan cowl 26.

As further shown in FIG. 4A, a handle 70 extends out of the door 62 in a handle deployed position 72, when the door 62 is in the open position 64. The latch indication system 10 (see FIGS. 1, 7A, 8A) comprises the handle 70 (see FIGS. 4A, 7A) coupled to an interior 132 (see FIGS. 6, 7A) of the fan cowl 26 (see FIGS. 6, 7A), where the handle 70 is an existing or known part on the fan cowl 26 (see FIGS. 1, 4A, 6, 7A). Once the handle 70 (see FIG. 4A) is deployed in the handle deployed position 72 (see FIG. 4A), the door 62 (see FIG. 4A), such as the oil tank door 62a (see FIG. 4A), cannot be closed until the handle 70 is moved back to a handle stowed position 74 (see FIG. 7A). As discussed in further detail below, the latch indication system 10 (see FIG. 7A) provides an interlock feature 174 (see FIG. 4A) that prevents moving the handle 70 (see FIGS. 4A, 8B) from the handle deployed position 72 (see FIGS. 4A, 8B) back to the handle stowed position 74 (see FIGS. 7A, 8A), when one or more latch assemblies 120 (see FIG. 8B) are in an unlatched condition 124 (see FIG. 8B).

Figure 4B:
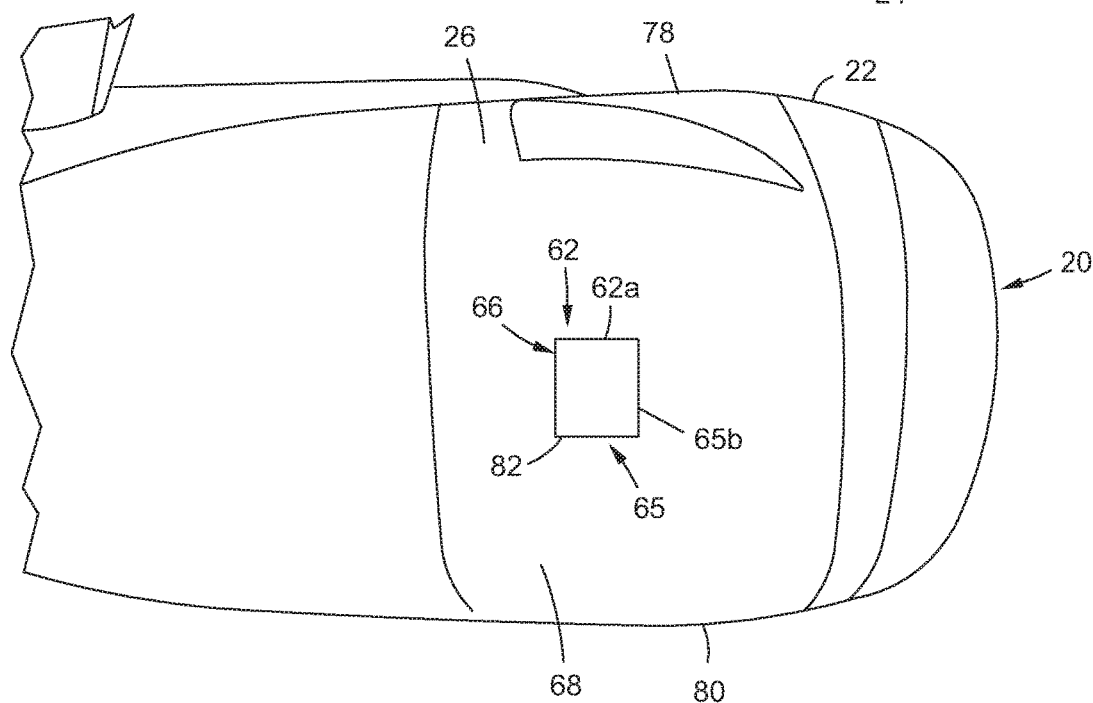
FIG. 4B is an illustration of a right side view of the engine of FIG. 4A showing the door on the fan cowl in a closed position.

Now referring to FIG. 4B, FIG. 4B is an illustration of a right side view of the engine 20 of FIG. 4A showing the door 62, such as the oil tank door 62a, in a closed position 66, and positioned at a location 82 on the first side 68 of the fan cowl 26. FIG. 4B further shows the nacelle 22, and shows the top end 78 and the bottom end 80 of the fan cowl 26. The door 62 (see FIG. 4B), such as the oil tank door 62a (see FIG. 4B), serves as, and is, a visual indicator 65 (see FIG. 4B), such as a visual indicator 65b (see FIG. 4B) in the closed position 66 (see FIG. 4B), for the latch indication system 10 (see FIGS. 7A, 8B), to indicate that one or more the latch assemblies 120 (see FIG. 8B) are in a latched condition 122 (see FIG. 8A).

Figure 4C:
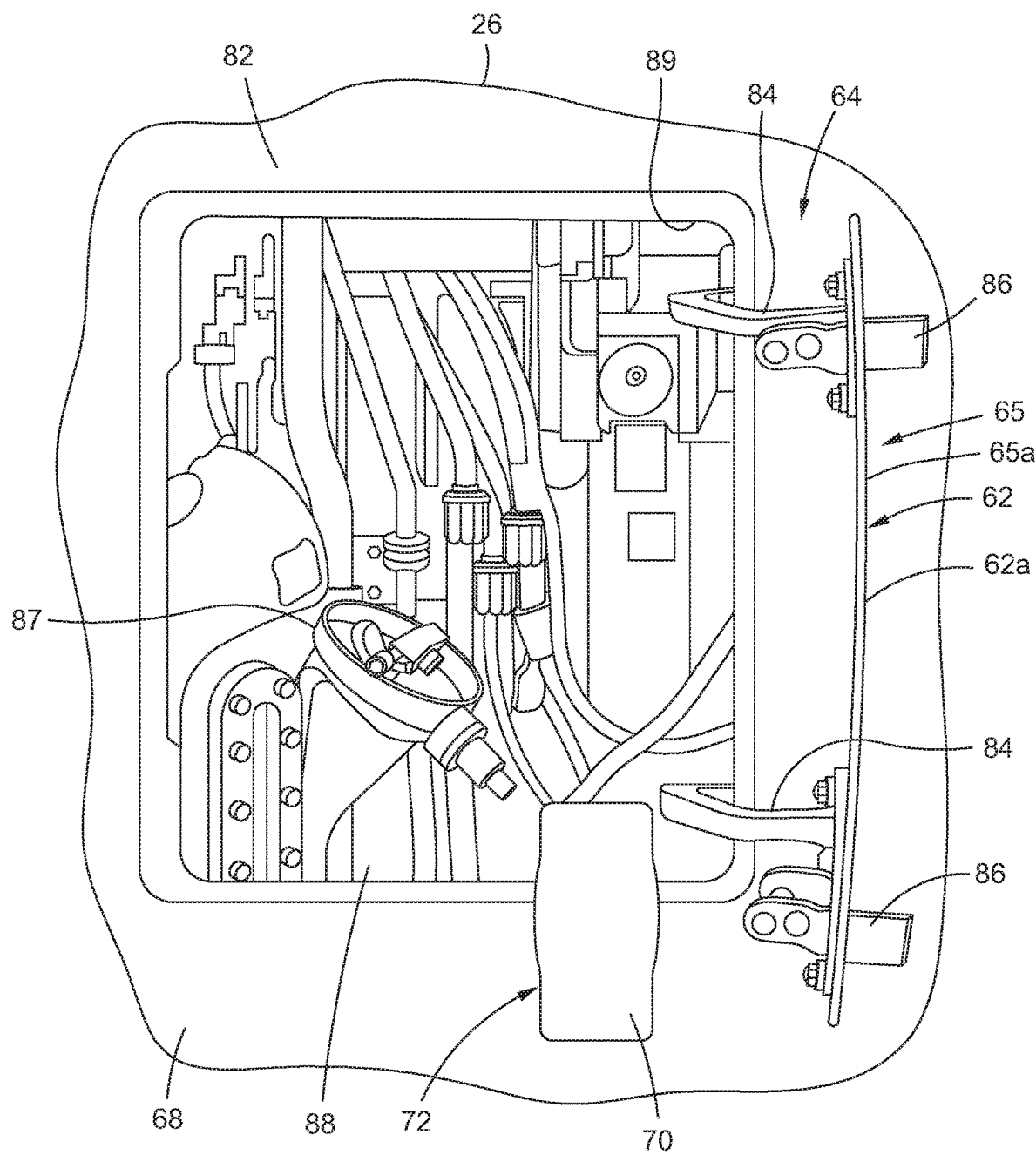
FIG. 4C is an illustration of an enlarged right side view of the door of FIG. 4B in an open position showing a handle in a handle deployed position.

Now referring to FIG. 4C, FIG. 4C is an illustration of an enlarged front perspective view of the door 62, such as the oil tank door 62a, of FIG. 4B in the open position 64, and positioned at the location 82 on the first side 68 of the fan cowl 26. As shown in FIG. 4C, the door, such as the oil tank door 62a, comprises door hinges 84, door locks 86, and a door opening 89, that opens into a compartment 88 housing an oil tank 87 and other various parts and components.

As further shown in FIG. 4C, the handle 70 is in the handle deployed position 72 and extends outwardly from the door opening 89, when the door 62 is in the open position 64, such as a fully open position of approximately 90 degrees. Adequate clearance to perform engine oil servicing or other maintenance and service operations 44 (see FIG. 2) is maintained. The door 62 (see FIG. 4C), such as the oil tank door 62a (see FIG. 4C), serves as, and is, the visual indicator 65 (see FIG. 4C), such as the visual indicator 65a (see FIG. 4C) in the open position 64 (see FIG. 4C), for the latch indication system 10 (see FIGS. 7A, 8B), to indicate that one or more the latch assemblies 120 (see FIG. 8B) are in an unlatched condition 124 (see FIG. 8B).

Figure 5A:
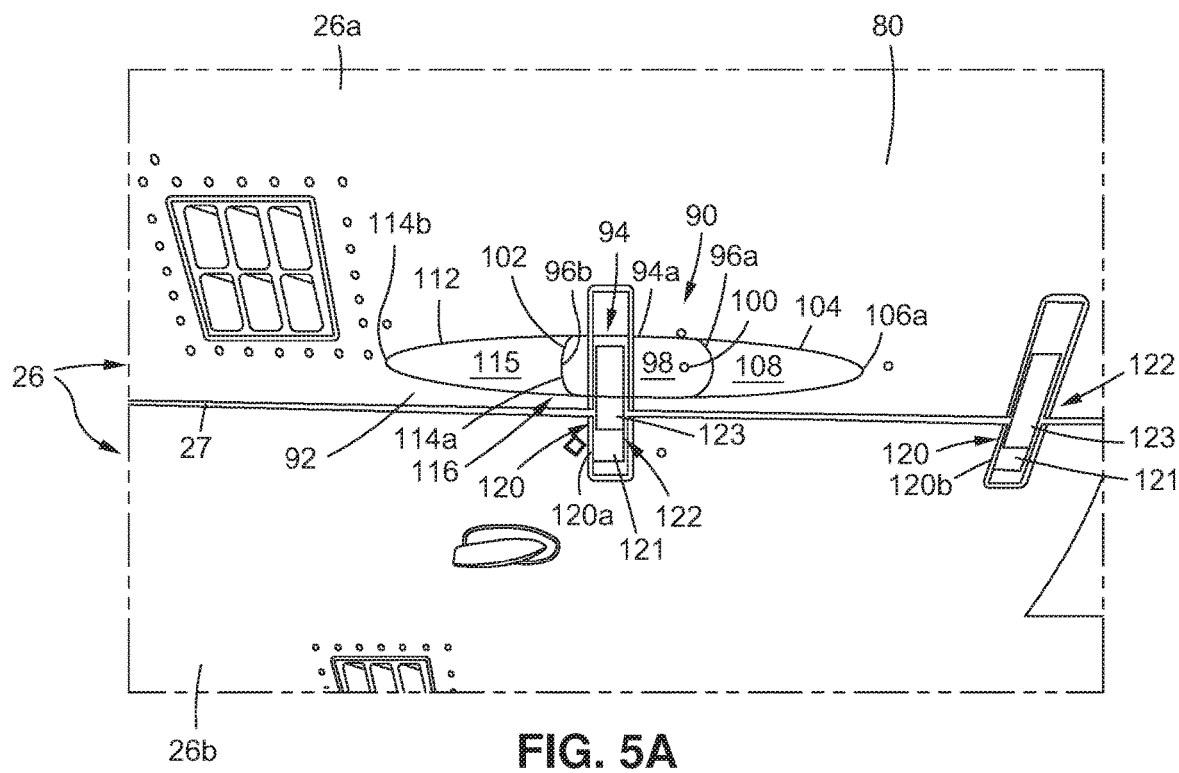
FIG. 5A is an illustration of a bottom perspective view of a fan cowl showing a movable member of a cover assembly in a movable member stowed position, and showing latch assemblies in a latched condition.
Figure 5B:
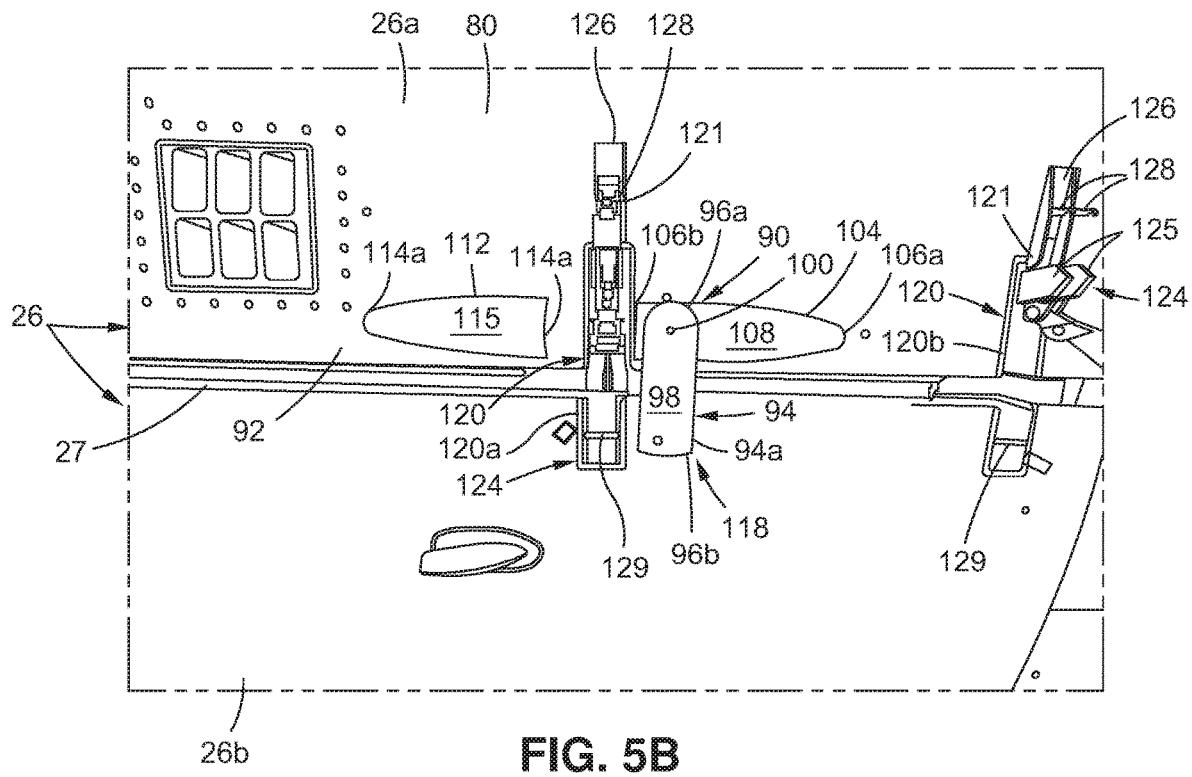
FIG. 5B is an illustration of a bottom perspective view of the fan cowl of FIG. 5A showing the movable member of the cover assembly in a movable member deployed position, and showing the latch assemblies in an unlatched condition.

Now referring to FIGS. 5A-5B, FIG. 5A is an illustration of a bottom perspective view of a fan cowl 26 showing a movable member 94 of a cover assembly 90 in a movable member stowed position 116, and showing the latch assemblies 120 in the latched condition 122. FIG. 5B is an illustration of a bottom perspective view of the fan cowl 26 of FIG. 5A showing the movable member 94 of the cover assembly 90 in a movable member deployed position 118, and showing the latch assemblies 120 in the unlatched condition 124.

As shown in FIGS. 5A-5B, the fan cowl 26, which is a left hand fan cowl, comprises a fan cowl first portion 26a, which is the half or portion of the fan cowl 26 that is inboard or nearest the fuselage 14 (see FIG. 1) of the air vehicle 12 (see FIGS. 1, 4A). As further shown in FIGS. 5A-5B, the fan cowl 26 comprises a fan cowl second portion 26b, which is the half or portion of the fan cowl 26 that is outboard or farthest away from the fuselage 14 (see FIG. 1) of the air vehicle 12 (see FIGS. 1, 4A).

As further shown in FIGS. 5A-5B, the cover assembly 90 is positioned at a location 92 at or near the bottom end 80 of the fan cowl first portion 26a. As further shown in FIGS. 5A-5B, the cover assembly 90 comprises the movable member 94. Preferably, the movable member 94 (see FIGS. 5A-5B) is in the form of a pivotable blade 94a (see FIGS. 5A-5B). As shown in FIGS. 5A-5B, the movable member 94, such as in the form of pivotable blade 94a, has a first end 96a which is fixed, a second end 96b which is non-fixed or free, and a body 98 formed between the first end 96a and the second end 96b. The body 98 (see FIGS. 5A-5B) has a through opening 100 (see FIGS. 5A-5B) formed through the body 98, and through which a movable member shaft 170 (see FIGS. 7A, 7D) is inserted to attach or fix the movable member 94 (see FIGS. 5A-5B) to a first fairing member 104 (see FIGS. 5A-5B) and to a bearing housing assembly 166 (see FIGS. 7A, 7D), discussed in further detail below.

As shown in FIGS. 5A-5B, the cover assembly 90 further comprises the first fairing member 104 having a first end 106a, a second end 106b (see FIG. 5B), and a body 108 formed between the first end 106a and the second end 106b. The through opening 100 (see FIGS. 5A-5B) is also formed through the body 108 (see FIGS. 5A-5B) of the first fairing member 104 (see FIGS. 5A-5B), and the movable member shaft 170 (see FIGS. 7A, 7D) is inserted to attach or fix the first fairing member 104 (see FIGS. 5A-5B) to the movable member 94 (see FIGS. 5A-5B) and to the bearing housing assembly 166 (see FIGS. 7A, 7D), discussed in further detail below.

As shown in FIGS. 5A-5B, the cover assembly 90 further comprises a second fairing member 112 having a first end 114a, a second end 114b, and a body 115 formed between the first end 114a and the second end 114b. The movable member 94 (see FIG. 5A) is coupled between the first fairing member 104 (see FIG. 5A) and the second fairing member 112 (see FIG. 5A). The second end 96b (see FIG. 5A) of the movable member 94 (see FIG. 5A) forms a closure interface 102 (see FIG. 5A) that is flush with the first end 114a (see FIG. 5A) of the second fairing member 112 (see FIG. 5A), when the movable member 94 is in the movable member stowed position 116 (see FIG. 5A). The closure interface 102 may comprise a lock, a latch, a clamp, an attachment element, or another suitable locking mechanism to securely retain the second end 96b (see FIG. 5A) of the movable member 94 (see FIG. 5A) to the first end 114a (see FIG. 5A) of the second fairing member 112 (see FIG. 5A).

The first fairing member 104 (see FIGS. 5A-5B) and the second fairing member 112 (see FIGS. 5A-5B) are structures designed to couple and interface with the movable member 94 (see FIGS. 5A-5B) which is the portion of the cover assembly 90 (see FIGS. 5A-5B) that covers the one or more latch assemblies 120 (see FIG. 5A). The first fairing member 104 (see FIGS. 5A-5B) and the second fairing member 112 (see FIGS. 5A-5B) are structures also designed to produce a smooth outline, reduce drag, and improve appearance.

As shown in FIG. 5A, the movable member 94 of the cover assembly 90 is in the movable member stowed position 116. As further shown in FIG. 5A, the movable member 94 covers one latch assembly 120, such as in the form of a first latch assembly 120a. The latch assembly 120 (see FIG. 5A), such as in the form of first latch assembly 120a (see FIG. 5A), is in the latched condition 122 (see FIG. 5A). FIG. 5A shows another latch assembly 120, such as in the form of a second latch assembly 120b, also in the latched condition 122. As shown in FIG. 5A, the latch assembly 120, such as in the forms of first latch assembly 120a and second latch assembly 120b, comprises a latch 121 having a latch lock 123. In this embodiment, only the first latch assembly 120a (see FIG. 5A), and in particular, all or part of the latch lock 123 (see FIG. 5A), is covered by the movable member 94, and the second latch assembly 120b (see FIG. 5A) is not covered by the movable member 94 of the cover assembly 90 or a separate movable member. In other embodiments, the movable member 94 of the cover assembly 90 may cover the second latch assembly 120b, or a second movable member of a second cover assembly may separately cover the second latch assembly 120b. An important purpose of the movable member 94 (see FIGS. 5A-5B), such as the pivotable blade 94a (see FIGS. 5A-5B), is to prevent an operator or user from unlatching the latch 121 (see FIG. 5A) of the latch assembly 120 (see FIG. 5A) without first opening the door 62 (see FIG. 4A) in the open position 64 (see FIG. 4A), as a visual indicator 65 (see FIG. 4A), and deploying the handle 70 (see FIGS. 4A, 4C) in the handle deployed position 72 (see FIGS. 4A, 4C). Also, because the movable member 94 (see FIGS. 5A-5B), such as the pivotable blade 94a (see FIGS. 5A-5B), covers all or part of the latch lock 123 (see FIG. 5A), of the latch 121 (see FIG. 5A), the movable member 94 (see FIGS. 5A-5B), such as the pivotable blade 94a (see FIGS. 5A-5B), of the cover assembly 90 (see FIG. 5A) prevents unlatching of the latch 121 (see FIG. 5A) of the latch assembly 120 (see FIG. 5A) without first opening the door 62 (see FIG. 4A) in the open position 64 (see FIG. 4A), as a visual indicator 65 (see FIG. 4A), and deploying the handle 70 (see FIGS. 4A, 4C) in the handle deployed position 72 (see FIGS. 4A, 4C).

FIG. 5B is an illustration of a bottom perspective view of the fan cowl 26 of FIG. 5A showing the movable member 94 of the cover assembly 90 in a movable member deployed position 118, and showing the latch assemblies 120 in an unlatched condition 124. As shown in FIG. 5B, the movable member 94 of the cover assembly 90 is in the movable member deployed position 118. As further shown in FIG. 5B, the movable member 94 is moved away from the latch 121 of the latch assembly 120, such as in the form of first latch assembly 120a, and is no longer covering the latch 121 of the latch assembly 120, such as in the form of first latch assembly 120a. The latch assembly 120 (see FIG. 5B), such as in the form of the first latch assembly 120a (see FIG. 5B) is in the unlatched condition 124 (see FIG. 5B). FIG. 5B also shows the latch assembly 120, such as in the form of the second latch assembly 120b, in the unlatched condition 124.

As further shown in FIG. 5B, each latch assembly 120 comprises one or more latch arms 125, and a latch handle 126 with one or more latch hooks 128. Each latch 126 (see FIG. 5B) of the latch assembly 120 (see FIG. 5B), including the one or more latch arms, and the latch handle 126 with the one or more latch hooks, is coupled to the fan cowl first portion 26a (see FIG. 5B). As shown in FIG. 5B, each latch assembly 120 further comprises a latch keeper 129. Each latch keeper 129 (see FIG. 5B) of the latch assembly 120 (see FIG. 5B) is coupled to the fan cowl second portion 26b (see FIG. 5B). The latch hooks 128 (see FIG. 5B) of each latch 126 (see FIG. 5B) are designed to latch to and lock to a corresponding latch keeper 129 (see FIG. 5B). Preferably, the fan cowl 26 (see FIGS. 5B, 6) has three latch assemblies 120 (see FIGS. 5B, 6). However, the fan cowl 26 (see FIG. 5B) may have less than three latch assemblies 120 (see FIG. 5B) or greater than three latch assemblies 120. The latch assemblies 120 (see FIGS. 5A-5B) are existing or known parts of the fan cowl 26 (see FIGS. 5A-5B).

Figure 6:
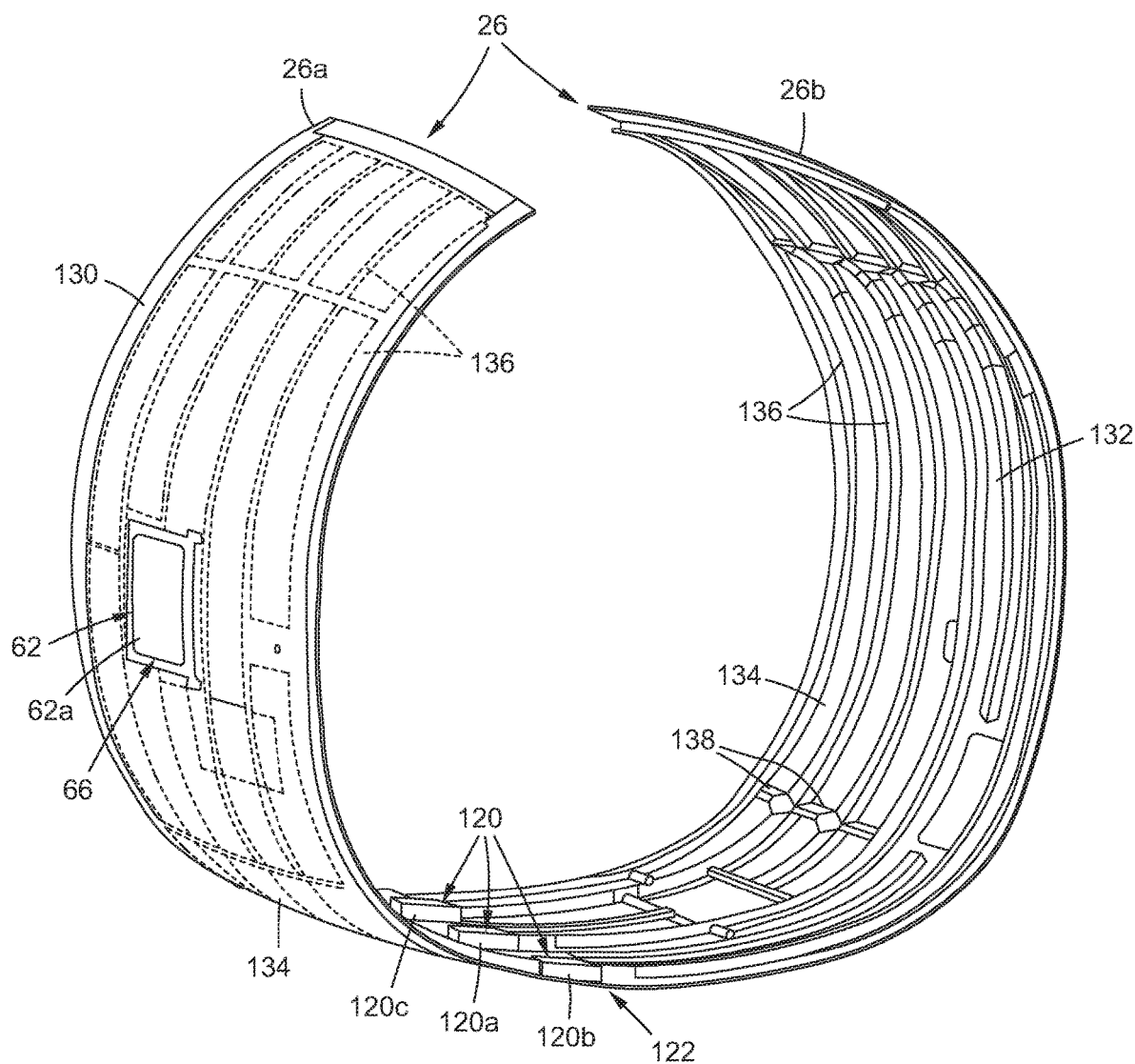
FIG. 6 is an illustration of a front perspective view of a fan cowl showing an interior of structural frame members.

Now referring to FIG. 6, FIG. 6 is an illustration of a front perspective view of a fan cowl 26 showing an exterior 130 and an interior 132 of the fan cowl 26. FIG. 6 shows the fan cowl first portion 26a and the fan cowl second portion 26b of the fan cowl 26. The exterior 130 (see FIG. 6) of the fan cowl 26 (see FIG. 6) is covered with a skin 134 (see FIG. 6). The interior 132 (see FIG. 6) of the fan cowl 26 (see FIG. 6) comprises a plurality of structural frame members 136 (see FIG. 6) attached to the inner surface of the skin 134 (see FIG. 6). A plurality of cross structural members 138 (see FIG. 6) are also attached to the inner surface of the skin 134 (see FIG. 6). and are arranged in a perpendicular configuration to the structural frame members 136 (see FIG. 6). The structural frame members 136 (see FIG. 6) may comprise circumferentially shaped beams or other suitable structures.

As further shown in FIG. 6, the door 62, such as the oil tank door 62a, is formed in the fan cowl first portion 26a of the fan cowl 26, and is in the closed position 66. As further shown in FIG. 6, the fan cowl first portion 26a is attached to the fan cowl second portion 26b with three latch assemblies 120, such as in the form of the first latch assembly 120a, the second latch assembly 120b, and a third latch assembly 120c. The three latch assemblies 120 (see FIG. 6) are shown in the latched condition 122 (see FIG. 6). However, it is appreciated that the number of latch assemblies 120 (see FIG. 6) may be less than three or greater than three in number.

Now referring to FIG. 7A, FIG. 7A is an illustration of a perspective view of the interior 132 of the fan cowl first portion 26a of the fan cowl 26, showing an embodiment of the latch indication system 10 of the disclosure. In an embodiment of the disclosure, there is provided the latch indication system 10 (see FIGS. 1, 7A) for the fan cowl 26 (see FIGS. 1, 7A) of an air vehicle 12 (see FIG. 1), such as an aircraft 12a (see FIG. 1).

As shown in FIG. 7A, the latch indication system 10 comprises the door 62. The door 62 (see FIG. 7A) has door hinges 84 (see FIG. 7A) and is movable between the closed position 66 (see FIG. 7A) and the open position 64 (see FIGS. 4A, 8B). The door 62 (see FIG. 7A) preferably comprises an oil tank door 62a (see FIG. 7A) located on the fan cowl first portion 26a (see FIG. 7A). As discussed above, the door 62 (see FIG. 7A) acts as a visual indicator 65 (see FIGS. 4A-4B). The door 62 (see FIGS. 4A, 4C, 8B) in the open position 64 (see FIGS. 4A, 4C, 8B) is a visual indicator 65a (see FIGS. 4A, 4C, 8B) that the one or more latch assemblies 120 (see FIG. 8B) are in the unlatched condition 124 (see FIG. 8B). The door 62 (see FIGS. 4B, 8A) in the closed position 66 (see FIGS. 4B, 8A) is a visual indicator 65b (see FIGS. 4B, 8A) that the one or more latch assemblies 120 (see FIG. 8A) are in the latched condition 122 (see FIG. 8A).

As further shown in FIG. 7A, the latch indication system 10 further comprises the handle 70 coupled to the interior 132 of the fan cowl 26. The handle 70 (see FIG. 7A) is movable between the handle stowed position 74 (see FIG. 7A) and the handle deployed position 72 (see FIGS. 4A, 8B), only when the door 62 (see FIGS. 4A, 8B) is in the open position 64 (see FIGS. 4A, 8B).

As shown in FIG. 7A, the latch indication system 10 further comprises a linkage assembly 140 mechanically connecting the handle 70 to the cover assembly 90 (see FIGS. 5A-5B, 7E, 8A-8B). As shown in FIG. 7A, the linkage assembly 140 comprises a handle coupling portion 142, a cable linking portion 144, and a cover assembly coupling portion 146.

As further shown in FIG. 7A, the handle coupling portion 142 comprises a handle shaft 148 coupled to the handle 70. The handle shaft 148 (see FIGS. 7A, 7B) has a first end 149a (see FIG. 7B) coupled to a first bearing housing 150a (see FIGS. 7A, 7B), and has a second end 149b (see FIG. 7B) coupled to a second bearing housing 150b (see FIGS. 7A, 7B) and to a first crank assembly 152a (see FIGS. 7A, 7B).

The handle coupling portion 142 (see FIG. 7A) is coupled to the cable linking portion 144 (see FIG. 7A). As further shown in FIG. 7A, the cable linking portion 144 comprises a cable 160 having a first end 162a coupled, via a first mounting hardware 164a, to a first rod 154a having a first rod end bearing 156a. The cable 160 (see FIG. 7A) further has a second end 162b (see FIG. 7A) coupled, via a second mounting hardware 164b (see FIG. 7A), to a second rod 154b (see FIG. 7A) having a second rod end bearing 156b (see FIG. 7A). As shown in FIG. 7A, the first end 162a of the cable 160 is mounted to a first portion 137a of a structural frame member 136, via the first mounting hardware 164a and a first cable bracket 158a. As further shown in FIG. 7A, the second end 162b of the cable 160 is mounted to a second portion 137b of the structural frame member 136, via the second mounting hardware 164b and a second cable bracket 158b. An optional debris shield (not shown) may be installed over the first cable bracket 158a and/or over the second cable bracket 158b.

The cable linking portion 144 (see FIG. 7A) is coupled to the cover assembly coupling portion 146 (see FIG. 7A). As further shown in FIG. 7A, the cover assembly coupling portion 146 comprises a movable member shaft 170 having a first end 172a coupled to a second crank assembly 152b. The movable member shaft 170 (see FIGS. 7A, 7D) further has a second end 172b (see FIG. 7E) portion that couples a bearing housing assembly 166 (see FIG. 7A) to the first fairing member 104 (see FIGS. 5A-5B, 7E) and to the movable member 94 (see FIGS. 5A-5B, 7E) of the cover assembly 90 (see FIGS. 5A-5B, 7E).

Figure 8A:
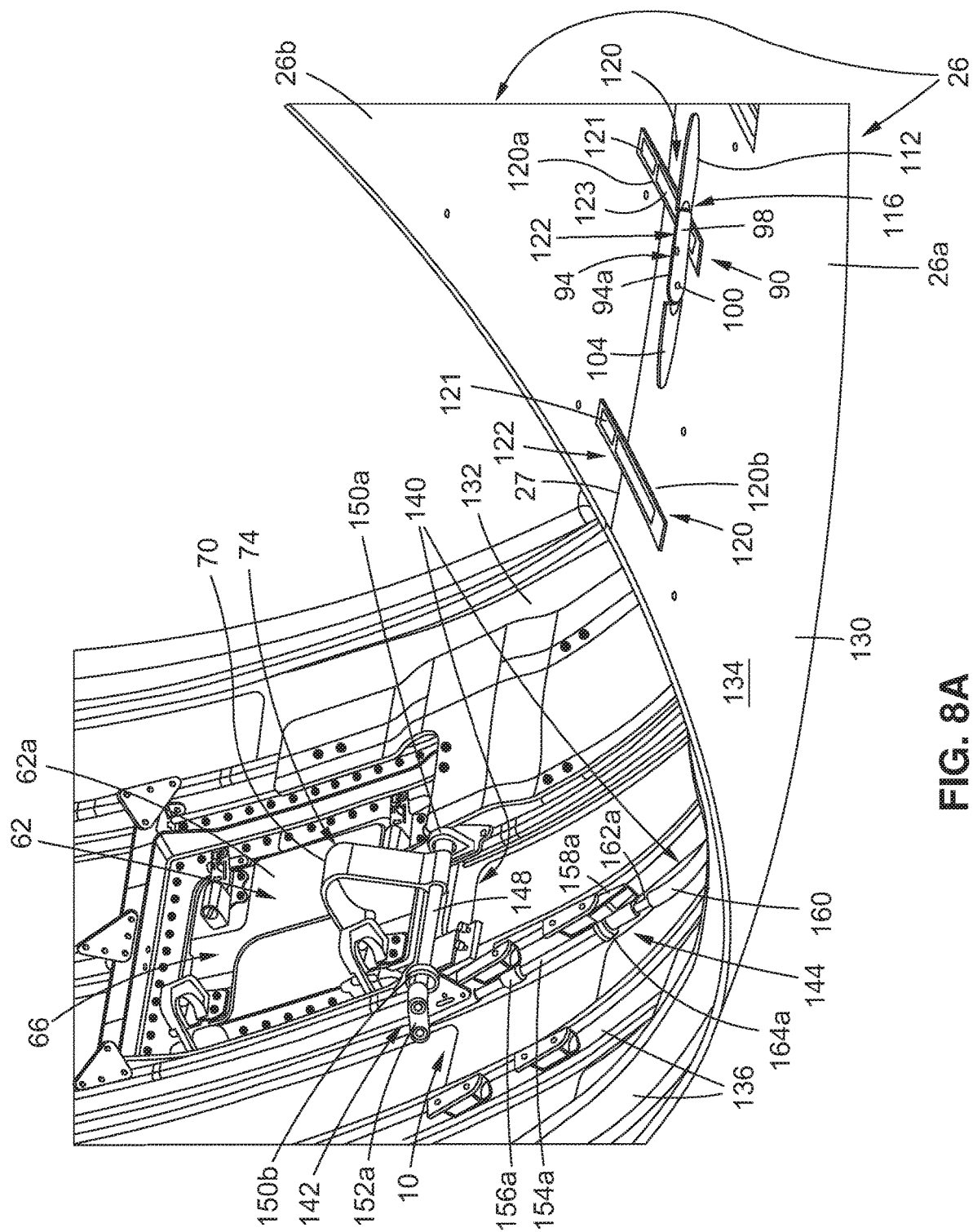
FIG. 8A is an illustration of a partial side perspective view of a fan cowl showing an embodiment of a latch indication system of the disclosure with a door in a closed position, a handle in a handle stowed position, a movable member of a cover assembly in a movable member stowed position, and latch assemblies in a latched condition.
Figure 8B:
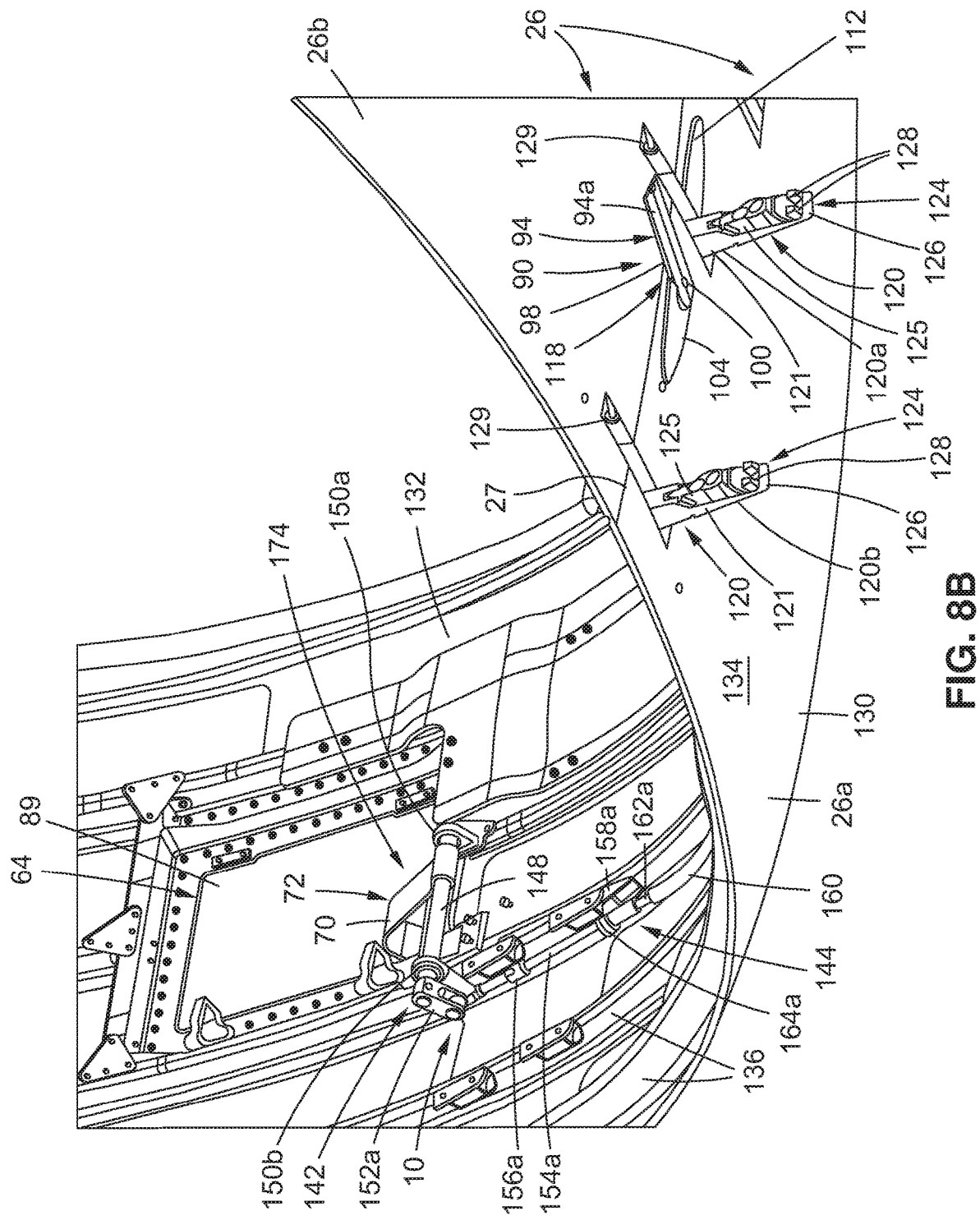
FIG. 8B is an illustration of a partial side perspective view of the fan cowl and latch indication system of FIG. 8A showing the door in an open position, the handle in a handle deployed position, the movable member of the cover assembly in a movable member deployed position, and latch assemblies in an unlatched condition.

The linkage assembly 140 (see FIG. 7A) of the latch indication system 10 (see FIG. 7A) further includes an interlock feature 174 (see FIGS. 4A, 8B). The interlock feature 174 (see FIGS. 4A, 8B) prevents movement of the handle 70 (see FIGS. 4A, 8B) from the handle deployed position 72 (see FIGS. 4A, 8B) to the handle stowed position 74 (see FIGS. 4B, 8A), when the one or more latch assemblies 120 (see FIG. 8B) are in the unlatched condition 124 (see FIG. 8B).

As further shown in FIG. 7A, the fan cowl 26 includes the skin 134, the structural frame members 136, and the cross structural members 138, as discussed above in relation to FIG. 6. As further shown in FIG. 7A, the fan cowl 26 includes the latch assemblies 120, such as in the form of first latch assembly 120a, second latch assembly 120b, and third latch assembly 120c. As discussed above, the number of latch assemblies 120 (see FIG. 6) may be less than three or greater than three in number.

Figure 7B:
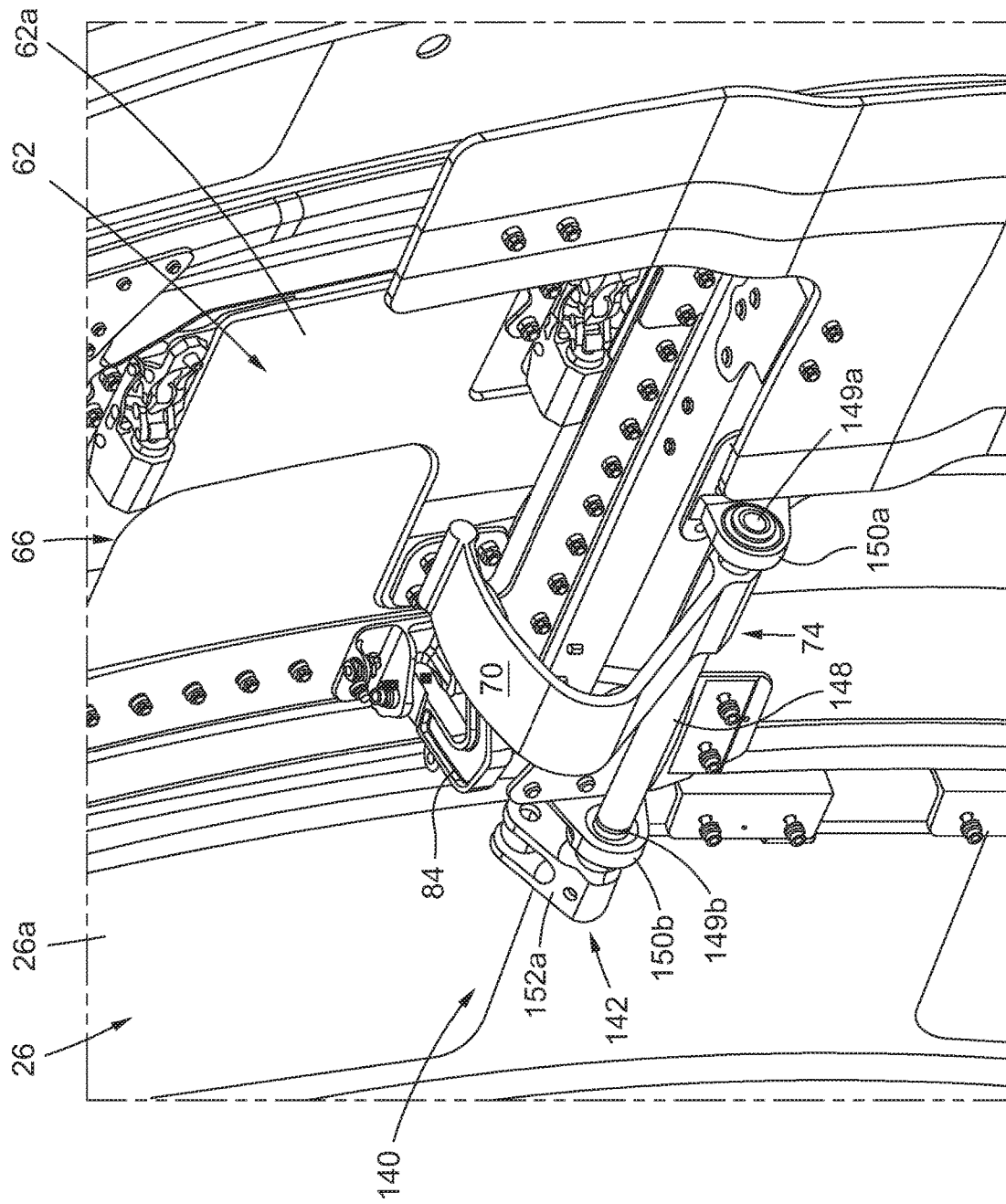
FIG. 7B is an illustration of an enlarged side perspective view of the fan cowl first portion of FIG. 7A showing a handle, a door, and a handle coupling portion.

Now referring to FIG. 7B, FIG. 7B is an illustration of an enlarged side perspective view of the fan cowl first portion 26a of the fan cowl 26 of FIG. 7A, showing the handle 70 in the handle stowed position 74, showing the door 62, such as the oil tank door 62a, in the closed position 66, and showing the handle coupling portion 142 of the linkage assembly 140. FIG. 7B shows the handle shaft 148 of the handle coupling portion 142, where the handle shaft 148 has the first end 149a coupled to the first bearing housing 150a and the second end 149b coupled to the second bearing housing 150b. FIG. 7B further shows the first crank assembly 152 of the handle coupling portion 142 coupled to the second bearing housing 150b, and shows the first crank assembly 152 located near the door hinge 84 of the door 62.

Figure 7C:
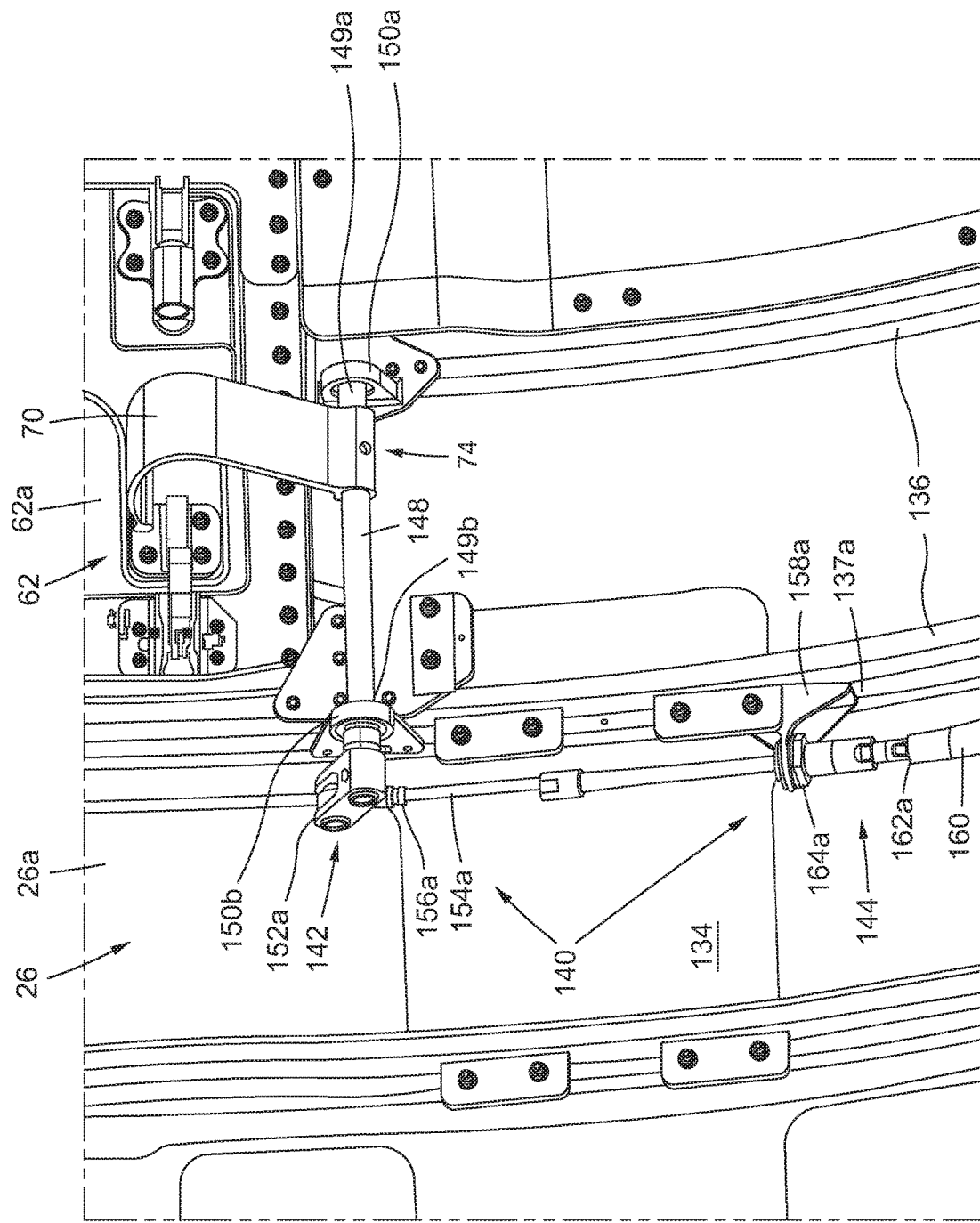
FIG. 7C is an illustration of an enlarged front perspective view of the fan cowl first portion of FIG. 7A showing the handle, the door, and the handle coupling portion, and showing a cable linking portion.

Now referring to FIG. 7C, FIG. 7C is an illustration of an enlarged front perspective view of the fan cowl first portion 26a of the fan cowl 26 of FIG. 7A, showing the handle 70 in the handle stowed position 74, showing the door 62, such as the oil tank door 62a, in the closed position 66 (see FIG. 7B), showing the handle coupling portion 142 of the linkage assembly 140, and showing the cable linking portion 144 of the linkage assembly 140. FIG. 7C shows the handle shaft 148 of the handle coupling portion 142, where the handle shaft 148 has the first end 149a coupled to the first bearing housing 150a and the second end 149b coupled to the second bearing housing 150b. FIG. 7C further shows the first crank assembly 152a of the handle coupling portion 142 coupled to the second bearing housing 150b, and also coupled to the first rod end bearing 156a of the cable linking portion 144. FIG. 7C further shows the first rod 154a coupled between the first rod end bearing 156a and the first mounting hardware 164a of the cable linking portion 144. FIG. 7C further shows the first mounting hardware 164a attached to the first cable bracket 158a. The first cable bracket 158a (see FIG. 7C) is attached to the first portion 137a (see FIG. 7C) of a structural frame member 136 (see FIG. 7C). The structural frame members 136 (see FIG. 7C) are attached to the skin 134 (see FIG. 7C). FIG. 7C further shows the first end 162a of the cable 160, of the cable linking portion 144, attached to the first mounting hardware 164a.

Figure 7D:
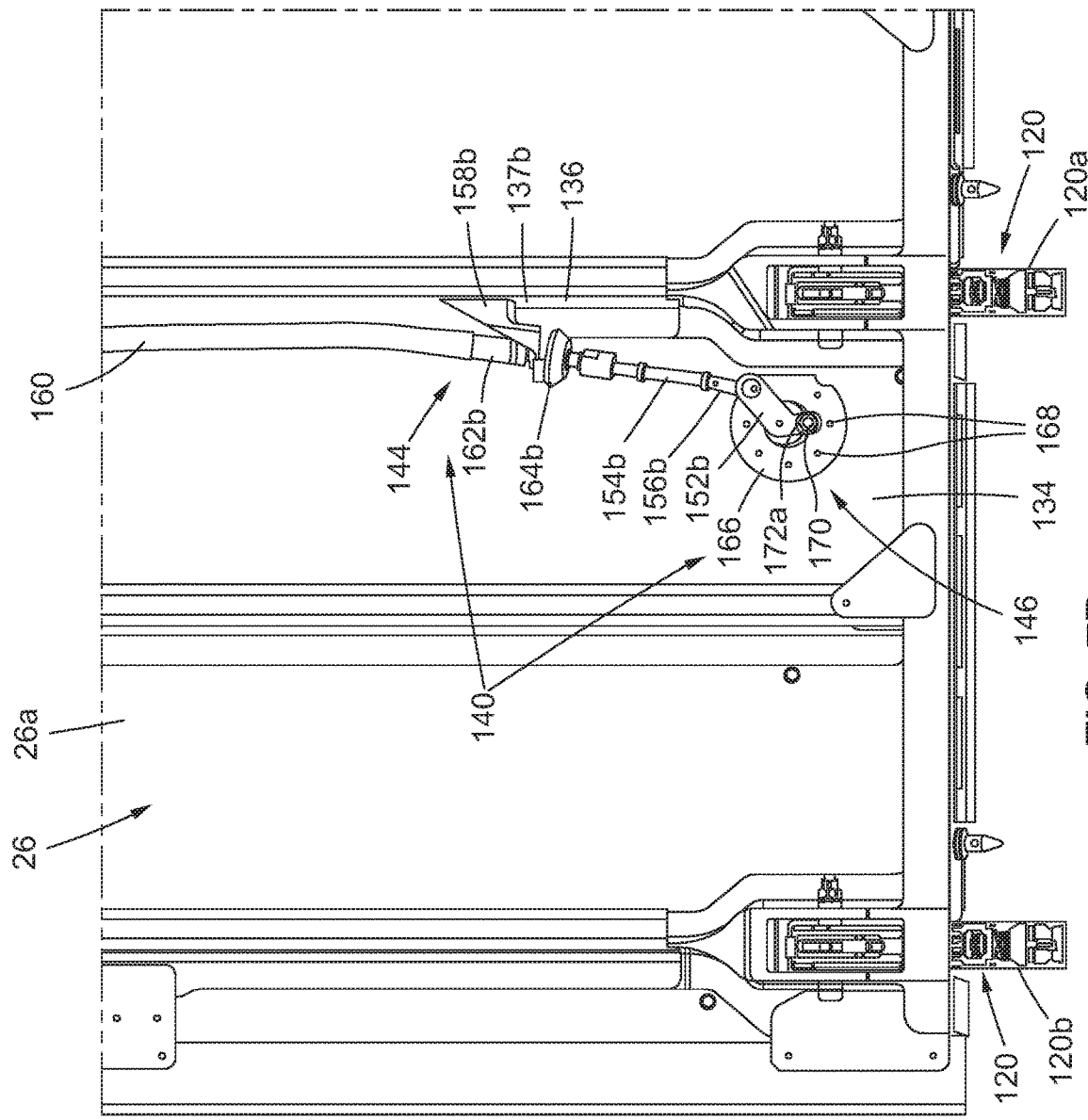
FIG. 7D is an illustration of an enlarged front perspective view of the fan cowl first portion of FIG. 7A showing a cable linking portion and a cover assembly coupling portion.

Now referring to FIG. 7D, FIG. 7D is an illustration of an enlarged front perspective view of the fan cowl first portion 26a of the fan cowl 26 of FIG. 7A, showing the cable linking portion 144 of the linkage assembly 140 and showing the cover assembly coupling portion 146 of the linkage assembly 140. FIG. 7D shows the second end 162b of the cable 160, of the cable linking portion 144, attached to the second mounting hardware 164b. FIG. 7D further shows the second mounting hardware 164b attached to the second cable bracket 158b. The second cable bracket 158b (see FIG. 7D) is attached to the second portion 137b (see FIG. 7D) of the structural frame member 136 (see FIG. 7C). FIG. 7D further shows the second rod 154b coupled between the second mounting hardware 164b and the second rod end bearing 156b of the cable linking portion 144. FIG. 7D further shows the second rod end bearing 156b coupled to the second crank assembly 152b of the cover assembly coupling portion 146.

Figure 7E:
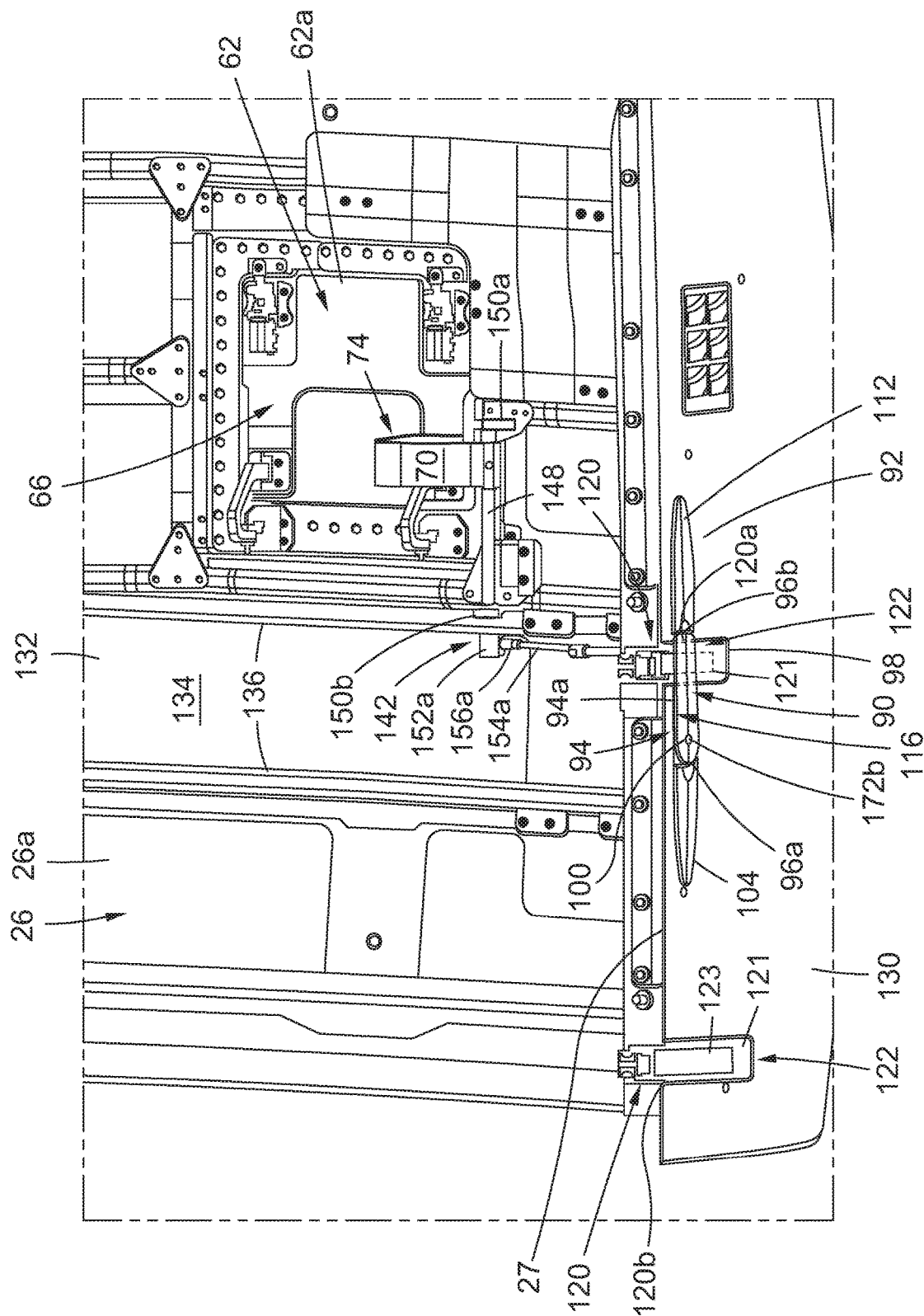
FIG. 7E is an illustration of an enlarged front perspective view of the fan cowl first portion of FIG. 7A showing the handle, the door, and the handle coupling portion, and showing a movable member of a cover assembly in a movable member stowed position.

The cover assembly coupling portion 146 (see FIG. 7D) comprises the movable member shaft 170 (see FIG. 7D) having the first end 172a (see FIG. 7D) coupled to the second crank assembly 152b (see FIG. 7D), and having the second end 172b (see FIG. 7D) coupling the bearing housing assembly 166 (see FIG. 7D) to the first fairing member 104 (see FIGS. 5A-5B, 7E), and the movable member 94 (see FIGS. 5A-5B, 7E) of the cover assembly 90 (see FIGS. 5A-5B, 7E). As further shown in FIG. 7D, the bearing housing assembly 166 is attached to the skin 134 via attachment elements 168, such as in the form of screws, bolts, or other suitable attachment elements. FIG. 7D further shows the latch assemblies 120, such as in the form of first latch assembly 120a and second latch assembly 120b.

Now referring to FIG. 7E, FIG. 7E is an illustration of an enlarged front perspective view of the exterior 130 and the interior 132 of the fan cowl first portion 26a of the fan cowl 26 of FIG. 7A, showing the handle 70 in the handle stowed position 74, showing the door 62, such as the oil tank door 62a, in the closed position 66, showing the handle coupling portion 142, and showing the cover assembly 90. FIG. 7E shows the handle shaft 148 coupled between the first bearing housing 150a and the second bearing housing 150b. FIG. 7E further shows the first crank assembly 152a of the handle coupling portion 142 coupled to the first rod 154a, via the first rod end bearing 156a. FIG. 7E further shows the structural frame members 136 attached to the skin 134.

As shown in FIG. 7E, the movable member 94, such as in the form of pivotable blade 94a, of the cover assembly 90, is in the movable member stowed position 116. The cover assembly 90 (see FIG. 7E) is positioned at location 92 (see FIG. 7E) of the fan cowl 26 (see FIG. 7E). The cover assembly 90 (see FIG. 7E) comprises the movable member 98 (see FIG. 7E) having the first end 96a (see FIG. 7E), the second end 96b (see FIG. 7E), and the body 98 (see FIG. 7E) with the through opening 100 (see FIG. 7E).

As shown in FIG. 7E, the cover assembly 90 further comprises the first fairing member 104 and the second fairing member 112. The movable member 94 (see FIG. 7E) of the cover assembly 90 (see FIG. 7E) is coupled between the first fairing member 104 (see FIG. 7E) and the second fairing member 112 (see FIG. 7E). The cover assembly 90

(see FIG. 7E) is located on the exterior 130 (see FIG. 7E) of the fan cowl 26 (see FIG. 7E).

FIG. 7E further shows the latch assemblies 120, such as in the form of first latch assembly 120a and second latch assembly 120b. Each latch assembly 120 (see FIG. 7E) comprises the latch 121 (see FIG. 7E) having the latch lock 123 (see FIG. 7E). FIG. 7E shows each latch 123 interior at the split line portion 27. The movable member 94 (see FIG. 7E), such as in the form of pivotable blade 94a (see FIG. 7E), covers all or part of the latch lock 123 (see FIG. 7E) of the first latch assembly 120a (see FIG. 7E), when the movable member 94 (see FIG. 7E), such as the pivotable blade 94a (see FIG. 7E), is in the movable member stowed position 116 (see FIG. 7E) and the first latch assembly 120a (see FIG. 7E) is in the latched condition 122 (see FIG. 7E). The movable member 94 (see FIG. 7E) is movable between the movable member stowed position 116 (see FIG. 7E) and the movable member deployed position 118 (see FIGS. 5B, 8B). When the door 62 (see FIG. 7E) is in the closed position 66 (see FIG. 7E) and the handle 70 (see FIG. 7E) is in the handle stowed position 74 (see FIG. 7E), the latch indication system 10 (see FIGS. 7A, 8A) indicates that one or more latch assemblies 120 (see FIGS. 7A, 7E, 8A) of the fan cowl 26 (see FIGS. 7A, 7E, 8A) are in the latched condition 122 (see FIGS. 7A, 7E, 8A). When the door 62 (see FIGS. 4A, 4C, 8B) is in the open position 64 (see FIGS. 4A, 4C, 8B) and the handle 70 (see FIGS. 4A, 4C, 8B) is in the handle deployed position 72 (see FIGS. 4A, 4C, 8B), the latch indication system 10 (see FIG. 8B) indicates that one or more of the latch assemblies 120 (see FIGS. 5B, 8B) of the fan cowl 26 (see FIGS. 5B, 8B) are in the unlatched condition 124 (see FIGS. 5B, 8B).

Now referring to FIG. 8A, FIG. 8A is an illustration of a partial side perspective view of the exterior 130 and the interior 132 of the fan cowl first portion 26a and the fan cowl second portion 26b of the fan cowl 26. The fan cowl first portion 26a (see FIG. 8A) and the fan cowl second portion 26b (see FIG. 8A) are adjacent each other at the split line portion 27 (see FIG. 8A). FIG. 8A shows the latch indication system 10 of the disclosure with the door 62, such as the oil tank door 62a, in the closed position 66, shows the handle 70 in the handle stowed position 74, shows the movable member 94, such as the pivotable member 94a, of the cover assembly 90 in the movable member stowed position 116, and shows the latch assemblies 120, such as first latch assembly 120a and second latch assembly 120b, in the latched condition 122. Each latch assembly 120 (see FIG. 8A), such as the first latch assembly 120a (see FIG. 8A) and the second latch assembly 120b (see FIG. 8A), comprises the latch 121 (see FIG. 8A) having the latch lock 123 (see FIG. 8A). The movable member 94 (see FIG. 8A), such as in the form of pivotable blade 94a (see FIG. 8A), covers all or part of the latch lock 123 (see FIG. 8A) of the first latch assembly 120a (see FIG. 8A), when the movable member 94 (see FIG. 8A), such as the pivotable blade 94a (see FIG. 8A), is in the movable member stowed position 116 (see FIG. 8A) and the first latch assembly 120a (see FIG. 8A) is in the latched condition 122 (see FIG. 8A). FIG. 8A further shows the body 98 of the movable member 94 having the through hole 100, and shows the movable member 94 coupled between the first fairing member 104 and the second fairing member 112.

FIG. 8A further shows the handle shaft 148 coupled between the first bearing housing 150a and the second bearing housing 150b. FIG. 8A further shows the first crank assembly 152a of the handle coupling portion 142 coupled to the first rod 154a, via the first rod end bearing 156a. FIG. 8A further shows the structural frame members 136 attached to the skin 134. FIG. 8A further shows the first rod 154a coupled between the first rod end bearing 156a and the first mounting hardware 164a of the cable linking portion 144. FIG. 8A further shows the first mounting hardware 164a attached to the first cable bracket 158a, and shows the first end 162a of the cable 160, of the cable linking portion 144, attached to the first mounting hardware 164a.

Now referring to FIG. 8B, FIG. 8B is an illustration of a partial side perspective view of the exterior 130 and the interior 132 of the fan cowl first portion 26a and the fan cowl second portion 26b of the fan cowl 26 of FIG. 8A. The fan cowl first portion 26a (see FIG. 8B) and the fan cowl second portion 26b (see FIG. 8B) are adjacent each other at the split line portion 27 (see FIG. 8B). FIG. 8B shows the latch indication system 10 of FIG. 8A with the door 62 (see FIG. 8A), such as the oil tank door 62a (see FIG. 8A), in the open position 64, shows the handle 70 in the handle deployed position 72 extending through the door opening 89, shows the movable member 94, such as the pivotable member 94a, of the cover assembly 90 in the movable member deployed position 118, and the shows the latch assemblies 120, such as first latch assembly 120a and second latch assembly 120b, in the unlatched condition 124. FIG. 8B shows the body 98 of the movable member 94 having the through hole 100, and shows the movable member 94 coupled between the first fairing member 104 and the second fairing member 112.

FIG. 8B further shows the handle shaft 148 coupled between the first bearing housing 150a and the second bearing housing 150b. FIG. 8B further shows the first crank assembly 152a of the handle coupling portion 142 coupled to the first rod 154a, via the first rod end bearing 156a. FIG. 8B further shows the structural frame members 136 attached to the skin 134. FIG. 8B further shows the first rod 154a coupled between the first rod end bearing 156a and the first mounting hardware 164a of the cable linking portion 144. FIG. 8B further shows the first mounting hardware 164a attached to the first cable bracket 158a, and shows the first end 162a of the cable 160, of the cable linking portion 144, attached to the first mounting hardware 164a.

As further shown in FIG. 8B, the latch assemblies 120 are in the unlatched condition 124, and each latch assembly 120, such as the first latch assembly 120a and the second latch assembly 120b, comprises the latch 121 having the latch arms 125, and the latch handle 26 having latch hooks 128. Each latch 121 (see FIG. 8B) of the latch assembly 120 (see FIG. 8B), including the latch arms 125 (see FIG. 8B), and the latch handle 26 (see FIG. 8B) having latch hooks 128 (see FIG. 8B), is coupled to the fan cowl first portion 26a (see FIG. 8B). As shown in FIG. 8B, each latch assembly 120 further comprises the latch keeper 129. Each latch keeper 129 (see FIG. 8B) of the latch assembly 120 (see FIG. 8B) is coupled to the fan cowl second portion 26b (see FIG. 8B).

In another embodiment of the disclosure, there is provided an air vehicle 12 (see FIGS. 1, 4A), such as in the form of aircraft 12a (see FIGS. 1, 4A). The air vehicle 12 (see FIGS. 1, 4A), such as in the form of aircraft 12a (see FIGS. 1, 4A), comprises a fuselage 14 (see FIG. 1), at least one wing 18 (see FIGS. 1, 4A) attached to the fuselage 14 (see FIG. 1), and one or more engines 20 (see FIGS. 1, 4A) attached to the at least one wing 18 (see FIGS. 1, 4A). Each of the one or more engines 20 (see FIGS. 1, 4A) has a fan cowl 26 (see FIGS. 1, 4A). The air vehicle 12 (see FIGS. 1, 4A), such as in the form of aircraft 12a (see FIGS. 1, 4A), further comprises the latch indication system 10 (see FIGS. 1, 7A) installed in each fan cowl 26 (see FIGS. 1, 4A, 7A).

As discussed in detail above, the latch indication system 10 (see FIGS. 1, 7A) comprises the door 62 (see FIG. 7A), such as the oil tank door 62a (see FIG. 7A), movable between the closed position 66 (see FIGS. 4B, 8A) and the open position 64 (see FIGS. 4A, 8B). The latch indication system 10 (see FIG. 7A) further comprises the handle 70 (see FIG. 7A) coupled to the interior 132 (see FIG. 7A) of the fan cowl 26 (see FIG. 7A). The handle 70 (see FIG. 7A) is movable between the handle stowed position 74 (see FIGS. 7A, 8A) and the handle deployed position 72 (see FIGS. 4A, 8B), only when the door 62 (see FIGS. 4A, 8B) is in the open position 64 (see FIGS. 4A, 8B).

The latch indication system 10 (see FIG. 7) of the air vehicle 12 (see FIGS. 1, 4A) further comprises the linkage assembly 140 (see FIG. 7) mechanically connecting the handle 70 (see FIG. 7) to the cover assembly 90 (see FIGS. 5A-5B, 8A-8B). The cover assembly 90 (see FIGS. 5A-5B, 8A-8B) has the movable member 94 (see FIGS. 5A-5B, 8A-8B), such as the pivotable blade 94a (see FIGS. 5A-5B, 8A-8B), movable between the movable member stowed position 116 (see FIGS. 5A, 8A) and the movable member deployed position 118 (see FIGS. 5B, 8B), such that when the door 62 (see FIG. 8A) is in the closed position 66 (see FIG. 8A) and the handle 70 (see FIG. 8A) is in the handle stowed position 74 (see FIG. 8A), the latch indication system 10 (see FIG. 8A) indicates that one or more latch assemblies 120 (see FIG. 8A) of the fan cowl 26 (see FIG. 8A) are in the latched condition 122 (see FIG. 8A), and when the door 62 (see FIG. 8B) is in the open position 64 (see FIG. 8B) and the handle 70 (see FIG. 8B) is in the handle deployed position 72 (see FIG. 8B), the latch indication system 10 (see FIG. 8B) indicates that one or more of the latch assemblies 120 (see FIG. 8B) of the fan cowl 26 (see FIG. 8B) are in the unlatched condition 124 (see FIG. 8B).

As discussed in detail above, the linkage assembly 140 (see FIG. 7A) of the latch indication system 10 (see FIG. 7A) comprises the handle coupling portion 142 (see FIG. 7A), the cable linking portion 144 (see FIG. 7A), and the cover assembly coupling portion 146 (see FIG. 7A). As shown in FIG. 7A, the handle coupling portion 142 comprises the handle shaft 148 coupled to the handle 70, where the first end 149a of the handle shaft 148 is coupled to the first bearing housing 150a, and the second end 149b of the handle shaft 148 is coupled to the second bearing housing 150b and to the first crank assembly 152a. The handle coupling portion 142 (see FIG. 7A) is coupled to the cable linking portion 144 (see FIG. 7A).

As shown in FIG. 7A, the cable linking portion 144 comprises the cable 160 having the first end 162a coupled to the first rod 154a having the first rod end bearing 156a. The cable 160 (see FIG. 7A) further has the second end 162b (see FIG. 7A) coupled to the second rod 154b (see FIG. 7A) having the second rod end bearing 156b (see FIG. 7A). The first end 162a (see FIG. 7A) of the cable 160 (see FIG. 7A) is mounted to the first portion 137a (see FIG. 7A) of the structural frame member 136 (see FIG. 7A), via the first mounting hardware 164a (see FIG. 7A) and the first cable bracket 158a (see FIG. 7A). The second end 162b (see FIG. 7A) of the cable 160 (see FIG. 7A) is mounted to the second portion 137b (see FIG. 7A) of the structural frame member 136 (see FIG. 7A), via the second mounting hardware 164b (see FIG. 7A) and the second cable bracket 158b (see FIG. 7A). The cable linking portion 144 (see FIG. 7A) is coupled to the cover assembly coupling portion 146 (see FIG. 7A).

The cover assembly coupling portion 146 (see FIG. 7D) comprises the movable member shaft 170 (see FIG. 7D) having the first end 172a (see FIG. 7D) coupled to the second crank assembly 152b (see FIG. 7D), and having the second end 172b (see FIG. 7D) coupled to the bearing housing assembly 166 (see FIG. 7D), the first fairing member 104 (see FIG. 7E), and the movable member 94 (see FIG. 7E) of the cover assembly 90 (see FIG. 7E).

Figure 9:
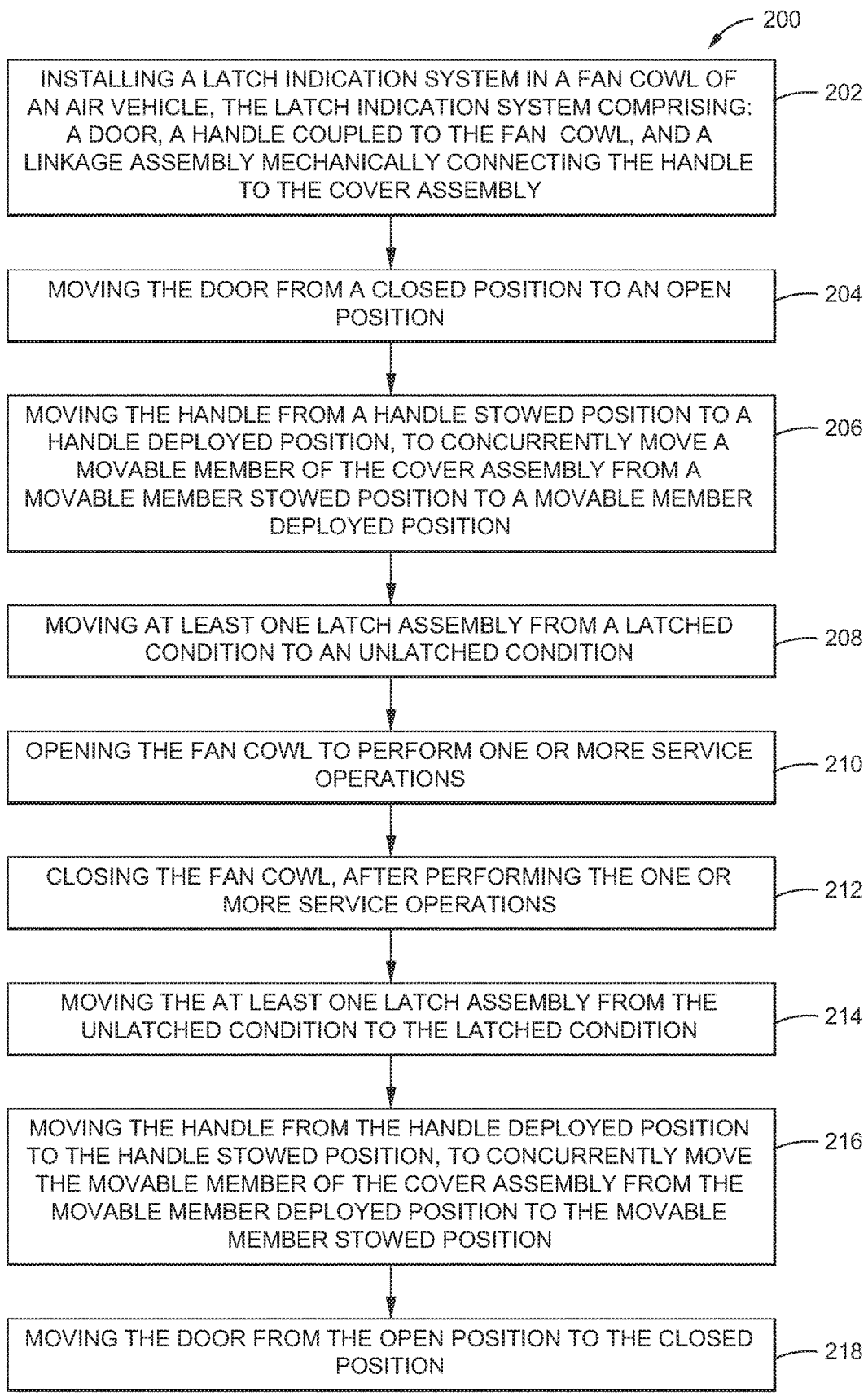
FIG. 9 is an illustration of a flow diagram showing an exemplary embodiment of a method of the disclosure.

Now referring to FIG. 9, FIG. 9 is an illustration of a flow diagram showing an exemplary embodiment of a method 200 of the disclosure. In another embodiment of the disclosure, as shown in FIG. 9, there is provided the method 200 for using the latch indication system 10 (see FIGS. 1, 7A) for the fan cowl 26 (see FIGS. 1, 7A) of the air vehicle 12 (see FIG. 1), such as the aircraft 12a (see FIG. 1). The method 200 (see FIG. 9) steps are preferably manually performed.

As shown in FIG. 9, the method 200 comprises step 202 of installing the latch indication system 10 (see FIGS. 1, 7A) in the fan cowl 26 (see FIGS. 1, 7A) of the air vehicle 12 (see FIG. 1), such as in the form of aircraft 12a (see FIG. 1). As discussed in detail above, the latch indication system 10 (see FIGS. 1, 7A) comprises the door 62 (see FIG. 7A), such as the oil tank door 62a (see FIG. 7A), the handle 70 (see FIG. 7A) coupled to the interior 132 (see FIG. 7A) of the fan cowl 26 (see FIG. 7A), and the linkage assembly 140 (see FIG. 7A) mechanically connecting the handle 70 (see FIG. 7A) to the cover assembly 90 (see FIGS. 8A-8B). The cover assembly 90 (see FIGS. 8A-8B) has the movable member 94 (see FIGS. 8A-8B) covering at least one latch assembly 120 (see FIGS. 8A-8B).

The movable member 94 (see FIGS. 5A-5B, 8A-8B), such as in the form of pivotable blade 94a (see FIGS. 5A-5B, 8A-8B), of the cover assembly 90 (see FIGS. 5A-5B, 8A-8B) positioned on the exterior 130 (see FIGS. 8A-8B) of the fan cowl 26 (see FIGS. 8A-8B), is used to cover at least one latch assembly 120 (see FIGS. 5A-5B, 8A-8B), when the at least one latch assembly 120 is in the latched condition 122 (see FIG. 8A) or stowed. The movable members 94 (see FIGS. 5A-5B, 8A-8B), such as in the form of pivotable blades 94a (see FIGS. 5A-5B, 8A-8B), are mechanically linked to the handle 70 (see FIGS. 4A, 7A, 8A), such as an operating handle, that cannot be accessed prior to opening the door 62 (see FIGS. 4A, 7A), such as the oil tank door 62a (see FIGS. 4A, 7A) on the first side 68 (see FIGS. 4A-4B) of the fan cowl 26 (see FIGS. 4A-4B).

The step 202 (see FIG. 9) of installing the latch indication system 10 (see FIGS. 1, 7A) in the fan cowl 26 (see FIGS. 1, 7A) of the air vehicle 12 (see FIG. 1) comprises installing 202 the latch indication system 10 (see FIGS. 1, 7A) comprising the linkage assembly 140 (see FIG. 7A) having the handle coupling portion 142 (see FIG. 7A), the cable linking portion 144 (see FIG. 7A), and the cover assembly coupling portion 146 (see FIG. 7A).

The step 202 (see FIG. 9) of installing the latch indication system 10 (see FIGS. 1, 7A) in the fan cowl 26 (see FIGS. 1, 7A) of the air vehicle 12 (see FIG. 1) further comprises installing 202 the latch indication system 10 (see FIGS. 1, 7A) comprising the linkage assembly 140 (see FIG. 7A) having the interlock feature 174 (see FIG. 8B) that prevents movement of the handle 70 (see FIGS. 7A, 8B) from the handle deployed position 72 (see FIG. 8B) to the handle stowed position 74 (see FIG. 8A), when the at least one latch assembly 120 (see FIG. 8B) is in the unlatched condition 124 (see FIG. 8B). The interlock feature 174 (see FIGS. 4A, 8B) prevents stowing the handle 70 (see FIGS. 7A, 8A) in the handle stowed position 74 (see FIGS. 7A, 8A), when the latch assemblies 120 (see FIG. 8B) are in the unlatched condition 124 (see FIG. 8B) or not latched.

As shown in FIG. 9, the method 200 further comprises step 204 of moving the door 62 (see FIGS. 4A, 4B, 7A), such as the oil tank door 62a (see FIGS. 4A, 4B, 7A), from the closed position 66 (see FIGS. 4B, 7A, 8A) to the open position 64 (see FIGS. 4A, 8B). As shown in FIG. 9, the method 200 further comprises step 206 of moving the handle 70 (see FIGS. 4A, 4C, 7A, 8A-8B) from the handle stowed position 74 (see FIGS. 7A, 8A) to the handle deployed position 72 (see FIGS. 4A, 8B), to concurrently move the movable member 94 (see FIGS. 8A-8B) of the cover assembly 90 (see FIGS. 8A-8B) from the movable member stowed position 116 (see FIG. 8A) to the movable member deployed position 118 (see FIG. 8B).

The step 206 (see FIG. 9) of moving the handle 70 (see FIGS. 4A, 4C, 7A, 8A-8B) from the handle stowed position 74 (see FIGS. 7A, 8A) to the handle deployed position 72 (see FIGS. 4A, 8B) comprises the handle 70 (see FIGS. 4A, 4C, 7A, 8A-8B) being visible from the exterior 130 (see FIGS. 4A, 8B) of the fan cowl 26 (see FIGS. 4A, 8B), when the handle 70 (see FIGS. 4A, 8B) is in the handle deployed position 72 (see FIGS. 4A, 8B), and comprises the door 62 (see FIGS. 4A, 8B) being unable to be moved from the open position 64 (see FIGS. 4A, 8B) to the closed position 66 (see FIGS. 4B, 8A), when the handle 70 (see FIGS. 4A, 8B) is in the handle deployed position 72 (see FIGS. 4A, 8A).

As shown in FIG. 9, the method 200 further comprises step 208 of moving the at least one latch assembly 120 (see FIGS. 8A-8B) from the latched condition 122 (see FIG. 8A) to the unlatched condition 124 (see FIG. 8B). Once the handle 70 (see FIGS. 4A, 7A, 8A) is deployed and moved from the handle stowed position 74 (see FIGS. 7A, 8A) to the handle deployed position 72 (see FIGS. 4A, 8B), the door 62 (see FIGS. 4A, 8B) cannot be closed or moved to the closed position 66 (see FIGS. 4B, 7A). The door 62 (see FIGS. 4A, 8B) in the open position 64 (see FIGS. 4A, 8B) serves as, and is, the visual indicator 65 (see FIGS. 4A, 4C) to indicate that the latch assemblies 120 (see FIG. 8B) are in the unlatched condition 124 (see FIG. 8B).

As shown in FIG. 9, the method 200 further comprises step 210 of opening the fan cowl 26 (see FIGS. 1, 4A, 6, 7A) to perform one or more maintenance and service operations 44 (see FIG. 2) or inspection operations. As shown in FIG. 9, the method 200 further comprises step 212 of closing the fan cowl 26 (see FIGS. 1, 4A, 6, 7A), after performing the one or more maintenance and service operations 44 (see FIG. 2) or inspection operations.

As shown in FIG. 9, the method 200 further comprises step 214 of moving the at least one latch assembly 120 (see FIGS. 8A-8B) from the unlatched condition 124 (see FIG. 8B) to the latched condition 122 (see FIG. 8A). As shown in FIG. 9, the method 200 further comprises step 216 of moving the handle 70 (see FIGS. 8A-8B) from the handle deployed position 72 (see FIG. 8B) to the handle stowed position 74 (see FIG. 8A), to concurrently move the movable member 94 (see FIGS. 8A-8B) of the cover assembly 90 (see FIGS. 8A-8B) from the movable member deployed position 118 (see FIG. 8B) to the movable member stowed position 116 (see FIG. 8A).

As shown in FIG. 9, the method 200 further comprises step 218 of moving the door 62 (see FIGS. 4A, 4B, 7A, 8A-8B), such as the oil tank door 62a (see FIGS. 4A, 4B, 7A, 8A-8B), from the open position 64 (see FIGS. 4A, 8B) to the closed position 66 (see FIGS. 4B, 7A, 8A). The door 62 (see FIGS. 4A, 4C, 8B), such as the oil tank door 62 (see FIGS. 4A, 4C, 8B), in the open position 64 (see FIGS. 4A, 4C, 8B) serves as, and is, a visual indicator 65 (see FIGS. 4A, 4C), such as visual indicator 65a (see FIGS. 4A, 4C), that the at least one latch assembly 120 (see FIG. 8B) is in the unlatched condition 124 (see FIG. 8B). The door 62 (see FIGS. 4B, 7A, 8A), such as the oil tank door 62a (see FIGS. 4B, 7A, 8A), in the closed position 66 (see FIGS. 4B, 7A, 8A) serves as, and is, a visual indicator 65 (see FIG. 4B), such as visual indicator 65b (see FIG. 4B) that the at least one latch assembly 120 (see FIG. 8A) is in the latched condition 122 (see FIG. 8A).

Disclosed embodiments of the latch indication system 10 (see FIGS. 7A-7E, 8A-8B) and the method 200 (see FIG. 9) provide a mechanical means to visually detect if latch assemblies 120 (see FIGS. 5A-5B, 8A-8B) on fan cowls 26 (see FIGS. 1, 4A, 7A, 8A-8B) are in the latched condition 122 (see FIG. 8A) or in the unlatched condition 124 (see FIG. 8B), and if the latch assemblies 120 have been latched after one or more maintenance and service operations 44 (see FIG. 2) or inspection operations. In addition to enhanced visualization, disclosed embodiments of the latch indication system 10 (see FIGS. 7A-7E, 8A-8B) and the method 200 (see FIG. 9) provide a safety means to prevent stowing or resetting the mechanical means and indication, such as the visual indicator 65, in the form of the visual indicator 65a (see FIG. 4A), of the door 62 (see FIGS. 4A, 8B) in the open position 64 (see FIGS. 4A, 8B), without completing the latching operation of the latch assemblies 120 (see FIGS. 6, 8B), with the latch assemblies 120 in the latched condition 122 (see FIG. 8A) and locked position. The cover assembly 90 (see FIG. 8A) covers the one or more latch assemblies 120 (see FIG. 8A), when the movable member 94 (see FIG. 8A) of the cover assembly 90 is in the movable member stowed position 116 (see FIG. 8A) and the one or more latch assemblies 120 are in the latched condition 122 (see FIG. 8A). The cover assembly 90 (see FIGS. 8A-8B) is mechanically linked to the handle 70 (see FIGS. 8A-8B) of the door 62 (see FIGS. 8A-8B), via the linkage assembly 140 (see FIG. 7A), and when the door 62 is moved from the closed position 66 (see FIG. 8A) to the open position 64 (see FIG. 8B), and the handle 70 is moved from the handle stowed position 74 (see FIG. 8A) to the handle deployed position 72 (see FIG. 78B), the movable member 94 (see FIG. 8A) of the cover assembly 90 moves from the movable member stowed position 116 (see FIG. 8A) to the movable member deployed position 118 (see FIG. 8B), and the one or more latch assemblies 120 can be unlatched and moved from the latched condition 122 (see FIG. 8A) to the unlatched condition 124 (see FIG. 8B).

Moreover, disclosed embodiments of the latch indication system 10 (see FIGS. 7A-7E, 8A-8B) and the method 200 (see FIG. 9) provide a more visible active indication system that mechanically links the one or more latch assemblies 120 (see FIGS. 8A-8B) to the visual indication, that is, the door 62 (see FIG. 8B) in the open position 64 (see FIG. 8B). The latch indication system 10 (see FIGS. 7A, 8A-8B) is manually deployed prior to unlatching the one or more latch assemblies 120 (see FIGS. 8A-8B), and the handle 70 (see FIGS. 8A-8B) coupled to the interior 132 (see FIGS. 8A-8B) of the fan cowl 26 (see FIGS. 8A-8B) cannot be stowed in the handle stowed position 74 (see FIG. 8A) or moved from the handle deployed position 72 (see FIG. 8A) to the handle stowed position 74 (see FIG. 8A), if the one or more latch assemblies 120 are not fully latched in the latched condition 122 (see FIG. 8A) or locked position. The latch indication system 10 (see FIGS. 7A-7E, 8A-8B) utilizes existing parts, such as the door 62 (see FIGS. 8A-8B), in the form of the oil tank door 62a (see FIGS. 8A-8B), on the fan cowl 26 (see FIGS. 8A-8B), and the handle 70 (see FIGS. 4C, 8A-8B), as obvious indications of the condition of the one or more latch assemblies 120. The door 62 (see FIGS. 8A-8B) is positioned and sized to be obvious to any ground maintenance or service operators, or flight deck personnel, during a routine walk around.

In addition, disclosed embodiments of the latch indication system 10 (see FIGS. 7A-7E, 8A-8B) and the method 200 (see FIG. 9) provide enhanced, real-time, visualization and detection, of the latched condition 122 (see FIG. 8A) or the unlatched condition 124 (see FIG. 8B) of the one or more latch assemblies 120 (see FIGS. 8A-8B) on the fan cowl 26 (see FIGS. 8A-8B). Unlike known or existing indication systems and methods, the latch indication system 10 (see FIGS. 7A-7E, 8A-8B) and the method 200 (see FIG. 9) does not require personnel or operators performing maintenance and service operations 44 (see FIG. 2) or inspection operations to access the flight deck of the air vehicle 12 (see FIGS. 1, 4A) to retrieve the information regarding the indication status of the latch assemblies 120 (see FIGS. 8A-8B).

Further, disclosed embodiments of the latch indication system 10 (see FIGS. 7A-7E, 8A-8B) and the method 200 (see FIG. 9) may be installed in unused or new air vehicles, or may be easily retrofitted into used or existing air vehicles. In addition, disclosed embodiments of the latch indication system 10 (see FIGS. 7A-7E, 8A-8B) and the method 200 (see FIG. 9) are simple to make, install, and use, and are reliable. Unlike known or existing indication systems and methods, the latch indication system 10 (see FIGS. 7A-7E, 8A-8B) and the method 200 (see FIG. 9) does not require the use of electronic components, such as sensors, and wiring installed at or in the fan cowl to provide an indication or signal to the flight deck equipment regarding a latched condition or an unlatched condition of the latch assemblies. Thus, the latch indication system 10 (see FIGS. 7A-7E, 8A-8B) and the method 200 (see FIG. 9) avoid reliability issues that may occur if such electronic components and wiring are exposed to a high heat and high vibration environment in the fan cowl and engine during flight. The mechanical structures of the latch indication system 10 (see FIGS. 7A-7E, 8A-8B) are preferably made of metal, composite, or a combination of metal and composite materials, and are durable and designed to withstand exposure to high heat and high vibration environment in the fan cowl and engine during flight. The latch indication system 10 includes non-complex parts and components that are simple to assemble and install.

The latch indication system 10 (see FIGS. 7A, 8A-8B) is a mechanically independent system, where the external movable member 94 (see FIG. 8A) covers at least one latch assembly 120 (see FIG. 8A), when the movable member 94 is in the movable member stowed position 116 (see FIG. 8A) and secured, and where the door 62 (see FIG. 8B) in the open position 64 (see FIG. 8B) provides a visual indication that the at least one latch assembly 120 (see FIG. 8B) is in the unlatched condition 124 (see FIG. 8B) and is not latched and secured. Due to the mechanical nature and structure of the latch indication system 10 (see FIGS. 7A, 8A-8B), the latch indication system 10 does not include or require any electrical or electronic components or parts. Further, the latch indication system 10 (see FIGS. 7A, 8A-8B) does not require electrical power to operate, such as aircraft power, and does not require electrical power to obtain the information regarding the indication status.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A latch indication system for a fan cowl of an air vehicle, the latch indication system comprising:
    a door movable between a closed position and an open position;
    a handle coupled to an interior of the fan cowl, the handle being movable between a handle stowed position and a handle deployed position, only when the door is in the open position; and
    a linkage assembly mechanically connecting the handle to a cover assembly, the cover assembly having a movable member movable between a movable member stowed position and a movable member deployed position, such that when the door is in the closed position and the handle is in the handle stowed position, the latch indication system indicates that one or more latch assemblies of the fan cowl are in a latched condition, and when the door is in the open position and the handle is in the handle deployed position, the latch indication system indicates that one or more of the latch assemblies of the fan cowl are in an unlatched condition,
    wherein the linkage assembly includes an interlock feature that prevents movement of the handle from the handle deployed position to the handle stowed position, when the one or more latch assemblies are in the unlatched condition.

2. The latch indication system of claim 1 wherein the linkage assembly comprises a handle coupling portion, a cable linking portion, and a cover assembly coupling portion.

3. The latch indication system of claim 2 wherein the handle coupling portion comprises a handle shaft coupled to the handle, the handle shaft having a first end coupled to a first bearing housing, and having a second end coupled to a second bearing housing and to a first crank assembly.

4. The latch indication system of claim 2 wherein the cable linking portion comprises a cable having a first end coupled to a first rod having a first rod end bearing, and the cable having a second end coupled to a second rod having a second rod end bearing.

5. The latch indication system of claim 4 wherein the first end of the cable is mounted to a first portion of a structural frame member via a first mounting hardware and a first cable bracket, and wherein the second end of the cable is mounted to a second portion of the structural frame member via a second mounting hardware and a second cable bracket.

6. The latch indication system of claim 2 wherein the cover assembly coupling portion comprises a movable member shaft having a first end coupled to a second crank assembly, and having a second end coupled to a bearing housing assembly and the movable member of the cover assembly.

7. The latch indication system of claim 1 wherein the door comprises an oil tank door located on a fan cowl first portion, and further wherein the door in the open position is a visual indicator that the one or more latch assemblies are in the unlatched condition, and the door in the closed position is a visual indicator that the one or more latch assemblies are in the latched condition.

8. The latch indication system of claim 1 wherein the movable member of the cover assembly comprises a pivotable blade.

9. The latch indication system of claim 1 wherein the movable member of the cover assembly is coupled between a first fairing member and a second fairing member, the cover assembly being located on an exterior of the fan cowl.

10. The latch indication system of claim 1 wherein the movable member prevents unlatching of the one or more latch assemblies without first opening the door in the open position and deploying the handle in the handle deployed position.

11. An air vehicle comprising:
a fuselage;
at least one wing attached to the fuselage;
one or more engines attached to the at least one wing, each of the one or more engines having a fan cowl; and
a latch indication system installed in each fan cowl, the latch indication system comprising:
    a door movable between a closed position and an open position;
    a handle coupled to an interior of the fan cowl, the handle being movable between a handle stowed position and a handle deployed position, only when the door is in the open position; and
    a linkage assembly mechanically connecting the handle to a cover assembly, the cover assembly having a movable member movable between a movable member stowed position and a movable member deployed position, such that when the door is in the closed position and the handle is in the handle stowed position, the latch indication system indicates that one or more latch assemblies of the fan cowl are in a latched condition, and when the door is in the open position and the handle is in the handle deployed position, the latch indication system indicates that one or more of the latch assemblies of the fan cowl are in an unlatched condition,
    wherein the linkage assembly includes an interlock feature that prevents movement of the handle from the handle deployed position to the handle stowed position, when the one or more latch assemblies are in the unlatched condition.

12. The air vehicle of claim 11 wherein the linkage assembly of the latch indication system comprises a handle coupling portion, a cable linking portion, and a cover assembly coupling portion.

13. The air vehicle of claim 12 wherein the handle coupling portion comprises a handle shaft coupled to the handle, the handle shaft having a first end coupled to a first bearing housing, and having a second end coupled to a second bearing housing and to a first crank assembly.

14. The air vehicle of claim 12 wherein the cable linking portion comprises a cable having a first end coupled to a first rod having a first rod end bearing, and the cable having a second end coupled to a second rod having a second rod end bearing, and further wherein the first end of the cable is mounted to a first portion of a structural frame member via a first mounting hardware and a first cable bracket, and wherein the second end of the cable is mounted to a second portion of the structural frame member via a second mounting hardware and a second cable bracket.

15. The air vehicle of claim 12 wherein the cover assembly coupling portion comprises a movable member shaft having a first end coupled to a second crank assembly, and having a second end coupled to a bearing housing assembly and the movable member of the cover assembly.

16. A method for using a latch indication system for a fan cowl of an air vehicle, the method comprising the steps of:
    installing the latch indication system in the fan cowl of the air vehicle, the latch indication system comprising:
        a door;
        a handle coupled to an interior of the fan cowl; and
        a linkage assembly mechanically connecting the handle to a cover assembly, the cover assembly having a movable member covering at least one latch assembly;
    moving the door from a closed position to an open position;
    moving the handle from a handle stowed position to a handle deployed position, to concurrently move the movable member of the cover assembly from a movable member stowed position to a movable member deployed position;
    moving the at least one latch assembly from a latched condition to an unlatched condition;
    opening the fan cowl to perform one or more maintenance and service operations;
    closing the fan cowl, after performing the one or more maintenance and service operations;
    moving the at least one latch assembly from the unlatched condition to the latched condition;
    moving the handle from the handle deployed position to the handle stowed position, to concurrently move the movable member of the cover assembly from the movable member deployed position to the movable member stowed position; and
    moving the door from the open position to the closed position;
    wherein the door in the open position is a visual indicator that the at least one latch assembly is in the unlatched condition, and wherein the door in the closed position is the visual indicator that the at least one latch assembly is in the latched condition.

17. The method of claim 16 wherein installing the latch indication system in the fan cowl of the air vehicle comprises installing the latch indication system comprising the linkage assembly having a handle coupling portion, a cable linking portion, and a cover assembly coupling portion.

18. The method of claim 16 wherein installing the latch indication system in the fan cowl of the air vehicle comprises installing the latch indication system comprising the linkage assembly having an interlock feature that prevents movement of the handle from the handle deployed position to the handle stowed position, when the one or more latch assemblies are in the unlatched condition.

19. The method of claim 16 wherein the method is manually performed.

20. The method of claim 16 wherein moving the handle from the handle stowed position to the handle deployed position comprises the handle being visible from an exterior of the fan cowl, when the handle is in the handle deployed position, and comprises the door being unable to be moved from the open position to the closed position, when the handle is in the handle deployed position.

* * * * *